US012638988B2

(12) United States Patent
King

(10) Patent No.: US 12,638,988 B2
(45) Date of Patent: *May 26, 2026

(54) METHODS AND ALLOCATORS FOR ALLOCATING PORTIONS OF A STORAGE UNIT USING VIRTUAL PARTITIONING

(71) Applicant: Imagination Technologies Limited, Kings Langley (GB)

(72) Inventor: Ian King, Shenley (GB)

(73) Assignee: Imagination Technologies Limited, Kings Langley (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/936,802

(22) Filed: Nov. 4, 2024

(65) Prior Publication Data

US 2025/0060890 A1      Feb. 20, 2025

Related U.S. Application Data

(63) Continuation of application No. 18/380,608, filed on Oct. 16, 2023, now Pat. No. 12,135,886, which is a
(Continued)

(30) Foreign Application Priority Data

May 12, 2020    (GB) ...................................... 2006951

(51) Int. Cl.
      *G06F 3/06*              (2006.01)
(52) U.S. Cl.
      CPC .......... G06F 3/0631 (2013.01); G06F 3/0604 (2013.01); G06F 3/0644 (2013.01);
      (Continued)

(58) Field of Classification Search
      CPC .... G06F 3/0631; G06F 3/0604; G06F 3/0644; G06F 3/0659; G06F 3/0665; G06F 3/067; G06F 9/5061; G06F 9/5016
      See application file for complete search history.

(56) References Cited

U.S. PATENT DOCUMENTS 5,727,181 A    3/1998  Beglin et al.
7,546,483 B1   6/2009  Overby et al.
                      (Continued)

FOREIGN PATENT DOCUMENTS

CN       107169916 A    9/2017
CN       108694072 A    10/2018
GB        2555929 A     5/2018

*Primary Examiner* — Michael Krofcheck
(74) *Attorney, Agent, or Firm* — Potomac Law Group, PLLC; Vincent M DeLuca

(57) ABSTRACT

Methods and storage unit allocators for allocating one or more portions of a storage unit to a plurality of tasks for storing at least two types of data. The method includes receiving a request for one or more portions of the storage unit to store a particular type of data of the at least two types of data for a task of the plurality of tasks; associating the request with one of a plurality of virtual partitionings of the storage unit based on one or more characteristics of the request, each virtual partitioning allotting none, one, or more than one portion of the storage unit to each of the at least two types of data; and allocating the requested one or more portions of the storage unit to the task from the none, one, or more than one portion of the storage unit allotted to the particular type of data in the virtual partitioning associated with the request.

20 Claims, 13 Drawing Sheets

Related U.S. Application Data continuation of application No. 17/318,981, filed on May 12, 2021, now Pat. No. 11,789,623.

(52) U.S. Cl.

CPC .......... *G06F 3/0659* (2013.01); *G06F 3/0665* (2013.01); *G06F 3/067* (2013.01)

(56) References Cited

U.S. PATENT DOCUMENTS

| | | |
|---|---|---|
| 8,832,369 B2 | 9/2014 | Zhang et al. |
| 10,255,653 B2 | 4/2019 | Sansottera et al. |
| 2006/0080505 A1 | 4/2006 | Arai et al. |
| 2007/0106872 A1 | 5/2007 | Shimada et al. |
| 2008/0229048 A1 | 9/2008 | Murase et al. |
| 2008/0256538 A1 | 10/2008 | Carter et al. |
| 2009/0119449 A1 | 5/2009 | Chengal |
| 2014/0181828 A1 | 6/2014 | Bird et al. |
| 2020/0233808 A1 | 7/2020 | Oma et al. |
| 2021/0165575 A1 | 6/2021 | Hutcheson, Jr. et al. |

300

RECEIVE REQUEST FOR ONE OR MORE PORTIONS OF STORAGE UNIT FOR STORING A SPECIFIC TYPE OF DATA    302

ASSOCIATE REQUEST WITH ONE OF A PLURALITY OF VIRTUAL PARTITIONINGS OF THE STORAGE UNIT BASED ON ONE OR MORE CHARACTERISTICS OF REQUEST    304

ALLOCATE REQUESTED PORTION(S) FROM PORTIONS OF STORAGE UNIT ALLOTTED TO SPECIFIC TYPE OF DATA IN VIRTUAL PARTITIONING    306

METHODS AND ALLOCATORS FOR ALLOCATING PORTIONS OF A STORAGE UNIT USING VIRTUAL PARTITIONING

CROSS-REFERENCE TO RELATED APPLICATIONS AND CLAIM OF PRIORITY

This application is a continuation under 35 U.S.C. 120 of copending application Ser. No. 18/380,608 filed Oct. 16, 2023, now U.S. Pat. No. 12,135,886, which is a continuation of prior application Ser. No. 17/318,981 filed May 12, 2021, now U.S. Pat. No. 11,789,623, which claims foreign priority under 35 U.S.C. 119 from United Kingdom Application No. 2006951.4 filed May 12, 2020, the contents of which are incorporated herein by reference in their entirety.

BACKGROUND

There are many applications in which it is desirable for multiple tasks to temporarily store multiple types of data in the same storage unit (e.g. memory), wherein the amount of the storage unit that is needed for each type of data may be variable. For example, as described in more detail below, a graphics processing unit may comprise one or more logic blocks (which may be referred to as a unified shading cluster) which are each configured to execute shading tasks. Each unified shading cluster may comprise, or may have access to, a storage unit (which may be referred to as a unified store) which is configured to temporarily store data related to the shading tasks that the unified shading cluster executes. The data that is stored in the unified store may fall into two categories—attribute data and temporary data. Attribute data is data that is stored prior to execution of the task which may be used to initialize or configure the task, whereas temporary data may be data that is stored during execution of the task.

Some shading tasks are configured to store both attribute data and temporary data, whereas other shading tasks are configured to store only temporary data. There are times where it is advantageous to use more of the storage unit for attribute data, and other times where it is advantageous to use more of the storage unit for temporary data. However, there may be dependencies between the types of data which mean that each task cannot be effectively granted access to the full storage unit.

For example, to reduce the amount of data that is allocated to a task before that task is ready to be executed, a task may be allocated portion(s) of the storage unit for storing attribute data before it is ready to be executed (so that the initialization data etc. can be stored in the storage unit), but the task may only be allocated portion(s) of the storage unit for storing temporary data when it is ready to be executed. This creates a dependency between attribute data and temporary data which if not considered in allocating portions of the storage unit to tasks can result in deadlock. For example, if each task can be allocated any portion of the storage unit for storing attribute data or temporary data, it is possible that together a number of tasks are allocated all of the portions of the storage unit for storing attribute data before any of the tasks are allocated any of the storage unit for storing temporary data resulting in deadlock. Specifically, none of the tasks will be able to be executed as none of the tasks will be able to obtain any of the storage unit for storing temporary data.

Accordingly, what is needed is a method of allocating a shared memory to a plurality of tasks for use in storing at least two different types of data that enables efficient use of the storage unit when the amount of the storage unit needed for each type of data is variable, yet ensures that deadlock will not occur when there is a dependency between different types of data.

The embodiments described below are provided by way of example only and are not limiting of implementations which solve any or all of the disadvantages of known methods and storage unit allocators for allocating portions of a storage unit to a plurality of tasks for storing at least two different types of data.

SUMMARY

This summary is provided to introduce a selection of concepts that are further described below in the detailed description. This summary is not intended to identify key features or essential features of the claimed subject matter, nor is it intended to be used to limit the scope of the claimed subject matter.

Described herein are methods and storage unit allocators for allocating one or more portions of a storage unit to a plurality of tasks for storing at least two types of data. The method includes receiving a request for one or more portions of the storage unit to store a particular type of data of the at least two types of data for a task of the plurality of tasks; associating the request with one of a plurality of virtual partitionings of the storage unit based on one or more characteristics of the request, each virtual partitioning allotting none, one, or more than one portion of the storage unit to each of the at least two types of data; and allocating the requested one or more portions of the storage unit to the task from the none, one, or more than one portion of the storage unit allotted to the particular type of data in the virtual partitioning associated with the request.

A first aspect provides a method of allocating one or more portions of a storage unit to a plurality of tasks for storing at least two types of data, the method comprising: receiving a request for one or more portions of the storage unit to store a particular type of data of the at least two types of data for a task of the plurality of tasks; associating the request with one of a plurality of virtual partitionings of the storage unit based on one or more characteristics of the request, each virtual partitioning allotting none, one, or more than one portion of the storage unit to each of the at least two types of data; and allocating the requested one or more portions of the storage unit to the task from the none, one, or more than one portion of the storage unit allotted to the particular type of data in the virtual partitioning associated with the request.

Each of the plurality of tasks may be associated with one task master of a plurality of task masters and the one or more characteristics of the request may comprise the task master associated with the task.

The plurality of virtual partitionings may comprise a virtual partitioning for each task master of the plurality of task masters.

A task master of the plurality of task masters may be associated with tasks that store a first type of data and a second type of data of the at least two types of data in the storage unit. A request for one or more portions of the storage unit, up to a maximum number of portions, for storing the second type of data for a task associated with the task master may be made subsequent to a request being made for one or more portions of the storage unit for storing the first type of data for that task. The virtual partitioning for the task master may allot at least the maximum number of portions of the storage unit to the second type of data.

Each virtual partitioning may allot no more than X-G portions of the storage unit to the first type of data, wherein X is a total number of portions of the storage unit and G is a guaranteed number of portions of the storage unit for use by a task to store the second type of data.

G may be a maximum number of portions of the storage unit that will be requested for storing the second type of data by any task of the plurality of tasks.

G may be less than a maximum number of portions of the storage unit that will be requested for storing the second type of data by any task of the plurality of tasks.

The method may further comprise, prior to receiving the request: determining whether the task requires more than the guaranteed number of portions of the storage unit for the second type of data; and in response to determining that the task requires more than the guaranteed number of portions of the storage unit for the second type of data, dynamically adjusting one or more of the virtual partitionings so that none of the virtual partitionings allot more than X–R portions of the storage unit to the first type of data wherein R is the number of portions of the storage unit required by the task for the second type of data and R is greater than G.

The task master of the plurality of task masters associated with the task may be identified by a field in the request or by sideband data accompanying the request.

The task may be one of a plurality of types of tasks, and the one or more characteristics of the request may comprise a type of the task.

The plurality of virtual partitionings may comprise a virtual partitioning for each type of task of the plurality of types of tasks.

At least one of the virtual partitionings may allot all portions of the storage unit to one of the at least two types of data.

Information may be stored in memory for each virtual partitioning of the plurality of virtual partitionings that indicates the none, one or more than one portions of the storage unit allotted to each type of data of the at least two types of data, and the method may further comprise reading the information stored in memory for the virtual partitioning associated with the request to determine the none, one or more than one portions of the storage unit associated with each type of data.

The method may further comprise: receiving a second request for one or more portions of the storage unit to store a specific type of data of the at least two types of data for a second task of the plurality of tasks; associating the second request with a different one of the plurality of virtual partitionings based on one or more characteristics of the second request; and allocating the requested one or more portions of the storage unit to the second task from the none, one, or more than one portion of the storage unit allotted to the specific type of data in the virtual partitioning associated with the second request.

At least two of the plurality of virtual partitionings may be different.

Each task of the plurality of tasks may be a shader task performed on a graphics processing unit.

The at least two types of data may comprise temporary data and attribute data.

The at least two types of data may comprise geometry data and tessellation data.

The storage unit may be a register file comprising a plurality of registers.

A second aspect provides a storage unit allocator for allocating one or more portions of a storage unit to a plurality of tasks for storing at least two types of data, the storage unit allocator comprising logic configured to: receive a request for one or more portions of the storage unit to store a particular type of data of the at least two types of data for a task of the plurality of tasks; associate the request with one of a plurality of virtual partitionings of the storage unit based on one or more characteristics of the request, each virtual partitioning allotting none, one, or more than one portion of the storage unit to each of the at least two types of data; and allocate the requested one or more portions of the storage unit to the task from the none, one, or more than one portion of the storage unit allotted to the particular type of data in the virtual partitioning associated with the request.

A third aspect provides a storage unit allocator configured to perform the method of the first aspect.

A fourth aspect provides a graphics processing unit comprising the storage unit allocator of the second aspect or the third aspect.

The storage unit allocators and graphics processing units described herein may be embodied in hardware on an integrated circuit. There may be provided a method of manufacturing, at an integrated circuit manufacturing system, a storage unit allocator or graphics processing unit described herein. There may be provided an integrated circuit definition dataset that, when processed in an integrated circuit manufacturing system, configures the system to manufacture the storage unit allocator or the graphics processing unit. There may be provided a non-transitory computer readable storage medium having stored thereon a computer readable description of a storage unit allocator or a graphics processing unit that, when processed in an integrated circuit manufacturing system, causes the integrated circuit manufacturing system to manufacture an integrated circuit embodying a storage unit allocator or a graphics processing unit.

There may be provided an integrated circuit manufacturing system comprising: a non-transitory computer readable storage medium having stored thereon a computer readable description of a storage unit allocator or a graphics processing unit described herein; a layout processing system configured to process the computer readable description so as to generate a circuit layout description of an integrated circuit embodying the storage unit allocators or the graphics processing unit; and an integrated circuit generation system configured to manufacture the storage unit allocator or the graphics processing unit according to the circuit layout description.

There may be provided computer program code for performing a method as described herein. There may be provided non-transitory computer readable storage medium having stored thereon computer readable instructions that, when executed at a computer system, cause the computer system to perform the methods as described herein.

The above features may be combined as appropriate, as would be apparent to a skilled person, and may be combined with any of the aspects of the examples described herein.

BRIEF DESCRIPTION OF THE DRAWINGS

Examples will now be described in detail with reference to the accompanying drawings in which.

Figure 1:
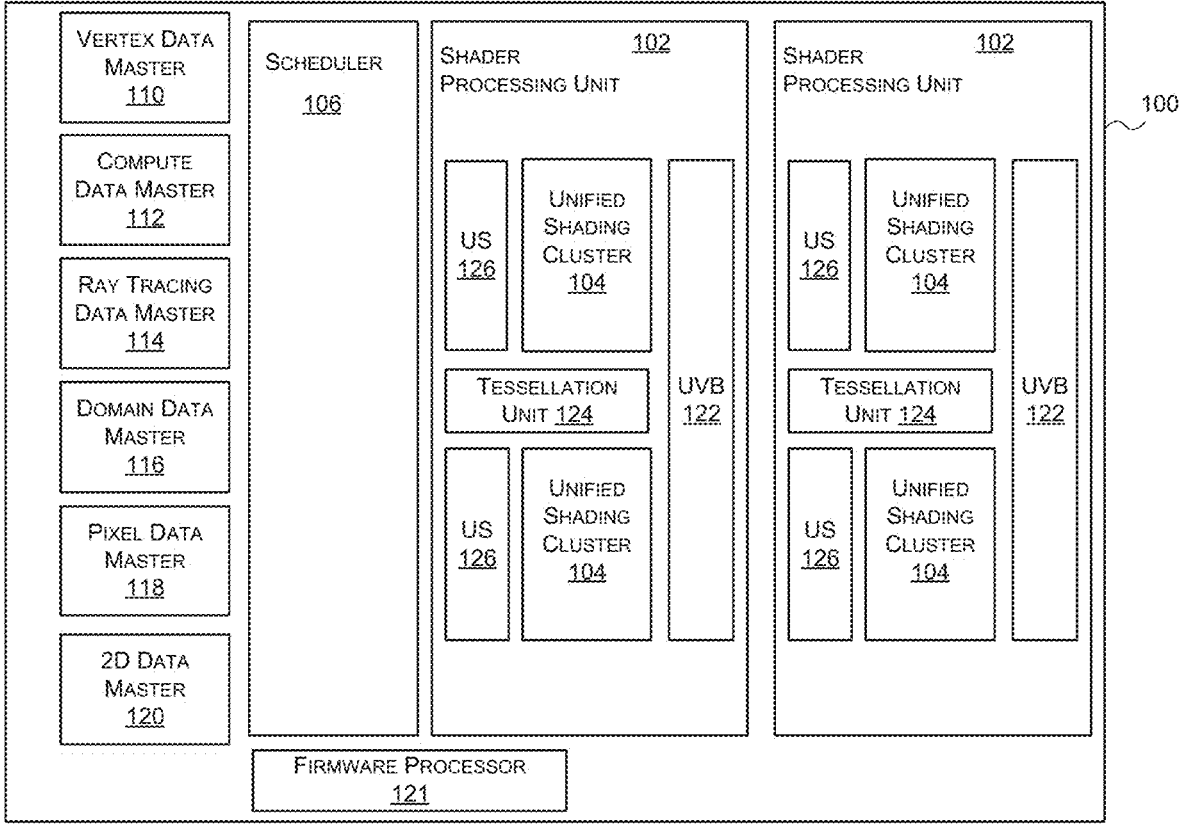
FIG. 1 is a block diagram of an example graphics processing unit comprising a plurality of unified shading clusters each with a unified store for storing at least two different types of data related to tasks executed by the corresponding unified shading cluster.

The accompanying drawings illustrate various examples. The skilled person will appreciate that the illustrated element boundaries (e.g., boxes, groups of boxes, or other shapes) in the drawings represent one example of the boundaries. It may be that in some examples, one element may be designed as multiple elements or that multiple elements may be designed as one element. Common reference numerals are used throughout the figures, where appropriate, to indicate similar features.

DETAILED DESCRIPTION

The following description is presented by way of example to enable a person skilled in the art to make and use the invention. The present invention is not limited to the embodiments described herein and various modifications to the disclosed embodiments will be apparent to those skilled in the art. Embodiments are described by way of example only.

As described above, there are many computing systems and applications in which a shared storage unit is used to store multiple types of data, and in some operating states it may be advantageous to use more of the storage unit for one type of data, and in another operating state it may be advantageous to use more of the storage unit for another type of data.

For example, a graphics processing unit (GPU) may be used to process geometry data (e.g. vertices defining primitives or patches) generated by an application in order to generate image data. Specifically, a GPU may determine pixel values (e.g. colour values) of an image to be stored in a frame buffer which may be output to a display. Part of the processing of the input geometry data may comprise running one or more shaders on the received data. As is known to those of skill in the art, a shader is a program run by a GPU that is used to implement rendering effects. They are called shaders because they are often used to control lighting and shading effects, but they may also implement other effects. Example shaders include, but are not limited to, vertex shaders (VS) which are used to transform the attributes of geometry (e.g. triangle) vertices such as colour, texture, position and direction; geometry shaders (GS) which have the ability to create new geometry on the fly; and pixel shaders (PS) and fragment shaders (FS) which are configured to operating on individual pixels and fragments respectively to generate complex visual effects. One or more shaders may be applied to the input data depending on the effects that are to be implemented.

A GPU may process the received geometry data in two phases—a geometry processing phase and a rasterization phase. In the geometry processing phase the geometry data (e.g. vertices defining primitives or patches) received from an application (e.g. a game application) is transformed into the rendering space (e.g. screen space). Other functions such as clipping and culling to remove geometry (e.g. primitives or patches) that falls outside of a viewing frustum, and/or lighting/attribute processing may also be performed in the geometry processing phase. In the rasterization phase the transformed primitives are mapped to pixels and the colour is identified for each pixel. This may comprise rasterizing the transformed geometry data (e.g. by performing scan conversion) to generate primitive fragments, removing primitive fragments that are hidden (e.g. hidden by other fragments), and performing texturing and/or shading on the primitive fragments that are not hidden to determine pixel values of a rendered image. The rendered pixel values may then be stored in memory. A GPU which performs hidden surface removal prior to performing texturing and/or shading is said to implement 'deferred' rendering. In other examples, a GPU might not implement deferred rendering in which case texturing/shading may be applied to fragments before hidden surface removal is performed on those fragments.

The term "fragment" is used herein to mean a sample of a primitive at a sampling point, which is to be processed to render pixels of an image. In some examples, there may be a one-to-one mapping of pixels to fragments. However, in other examples there may be more fragments than pixels, and this oversampling can allow for higher quality rendering of pixel values, e.g. by facilitating anti-aliasing and other filters that may be applied to multiple fragments for rendering each of the pixel values.

Different shaders may be applied during different phases. For example, vertex shaders and geometry shaders may be applied in the geometry processing phase, and fragment shaders may be applied in the rasterization phase. Traditionally GPUs had separate hardware to perform geometry processing phase shading (e.g. vertex shading and/or geometry shading) and rasterization phase shading (e.g. pixel shading or fragment shading). However, GPUs have now transitioned to unified shading models wherein they have common or unified shader hardware that can perform any type of shading task. For example, FIG. 1 illustrates an example GPU 100 with a plurality of shader processing units 102. Each shader processing unit 102 comprises a plurality of unified shading clusters (USC) 104 which can execute any type of shading task. Specifically, each USC 104 receives shader tasks from a scheduler 106 which specify the data to be processed and the shader program to be applied to that data. In response to receiving a task, a USC 104 runs the identified shader program against the identified data.

The shader tasks may be initiated by a plurality of different components, which may be referred to as task masters or data masters. For example, the GPU 100 of FIG. 1 comprises a vertex data master (VDM) 110, a compute data master (CDM) 112, a ray tracing data master (RDM) 114, a domain data master (DDM) 116, a pixel data master (PDM) 118 and a 2D data master (TDM) 120 each of which can initiate or invoke shader tasks. It will be evident to a person of skill in the art that these are only example task masters or data masters which may initiate or invoke shader tasks, and that in other examples there may be fewer, additional and/or different task masters or data masters.

The GPU 100 of FIG. 1 also comprises a firmware processor 121 which runs firmware configured to control the scheduling of work on the GPU 100. For example, the work may be divided into processing phases which can be individually scheduled. There may be a plurality of different types of processing phases. For example, there may be a vertex or geometry processing phase, a compute processing phase, a ray tracing processing phase, a pixel or fragment processing phase, and a 2D processing phase. Each processing phase is associated with one or more data masters and performs certain processing on a set of data using a variety of different components within the GPU. Some of the components, such as the USCs 104, may be shared between processing phases whereas other components may only be used in a single type of processing phase.

In some cases, the host computer (e.g. CPU) may be configured to generate a control stream for each processing phase (except for the pixel or fragment processing phase) and the one or more data masters associated with a processing phase consume work via the control stream for that processing phase. In these cases, the firmware processor 121 may be configured to start a processing phase (which may be referred to as kicking a processing phase) by notifying the appropriate data master that there is a control stream to be processed. This causes the data master to initiate one or more shader tasks for execution on the USCs 104. In some cases, the firmware processor 121 may be configured to notify a data master that there is a control stream to be processed by writing to a specific register (which may be referred to as the kick register) associated with the data master. For example, to cause the vertex data master 110 to begin a vertex or geometry processing phase the firmware processor 121 may write to the vertex data master's kick register. In some cases, prior to causing a data master to start a processing phase, the firmware processor 121 may be configured to program one or more configuration registers which may, for example, specify how the processing phase is to be executed or performed. When a data master has finished processing a control stream then the data master is said to have completed the processing phase and may notify the firmware processor 121 (e.g. by raising an interrupt).

The firmware processor 121 may be configured to schedule the processing of control streams via processing phases in accordance with one or more rules and/or scheduling criteria. For example, it may be permissible to have multiple different processing phases running at the same time, but it may not be permissible to have more than one processing phase of any type running at the same time. For example, it may be permissible to have a geometry processing phase running at the same time as a pixel/fragment processing phase, but it may not be permissible to have two pixel/fragment processing phases running at the same time. In other examples, the firmware processor 121 may have to schedule the control streams and processing phases based on dependencies between them. For example, a first fragment processing phase may not be able to be performed or executed until a first geometry processing phase is complete because of a dependency between the two. It will be evident to a person of skill in the art that this is an example only and that other GPUs may not have a firmware processor 121 and the scheduling of work on the GPU may be controlled by, for example, a driver running on the host computer (e.g. CPU). It will also be evident to a person of skill in the art that a GPU may also comprise other components which are not shown, such as, but not limited to a tiling engine (if the GPU supports tiled-based rendering), a system level cache and a memory management unit (MMU).

As shown in FIG. 1 each shader processing unit 102 may comprise other components, such as, but not limited to, a storage unit (referred to as the unified vertex buffer (UVB)) 122 for storing the output of the shader tasks performed in the geometry processing phase; a tessellation unit 124 which is configured to subdivide patches into smaller primitives; and a storage unit (referred to as the unified store (US)) 126 for each USC 104 which is used to temporarily store data for the tasks that the USC 104 executes. In some cases, each US 126 may be implemented as a register file.

Specifically, to execute a shader task, data may need to be temporarily stored. In one example implementation the data stored for a shader task may be divided into two classes, categories or types: (i) attribute data which is stored by the task master or initiator (e.g. data master) prior to the task being executed; and (ii) temporary data which is stored by the USC (e.g. by the shader program) during execution of the task. Attribute data may be used to provide input data or initialization parameters for a task. Some tasks, such as vertex shader tasks and compute shader tasks may store both types of data, whereas other tasks, such as 2D shader tasks or pixel shader tasks may only store one type of data (e.g. temporary data). Some tasks, such as vertex shader tasks, may store more attribute data than temporary data; and other tasks, such as pixel shader tasks, may store more temporary data than attribute data. Accordingly, before a task can be executed by a USC 104 the task has to be allocated one or more portions (e.g. registers) of the US 126 for each type of data is needs to store.

Figure 2:
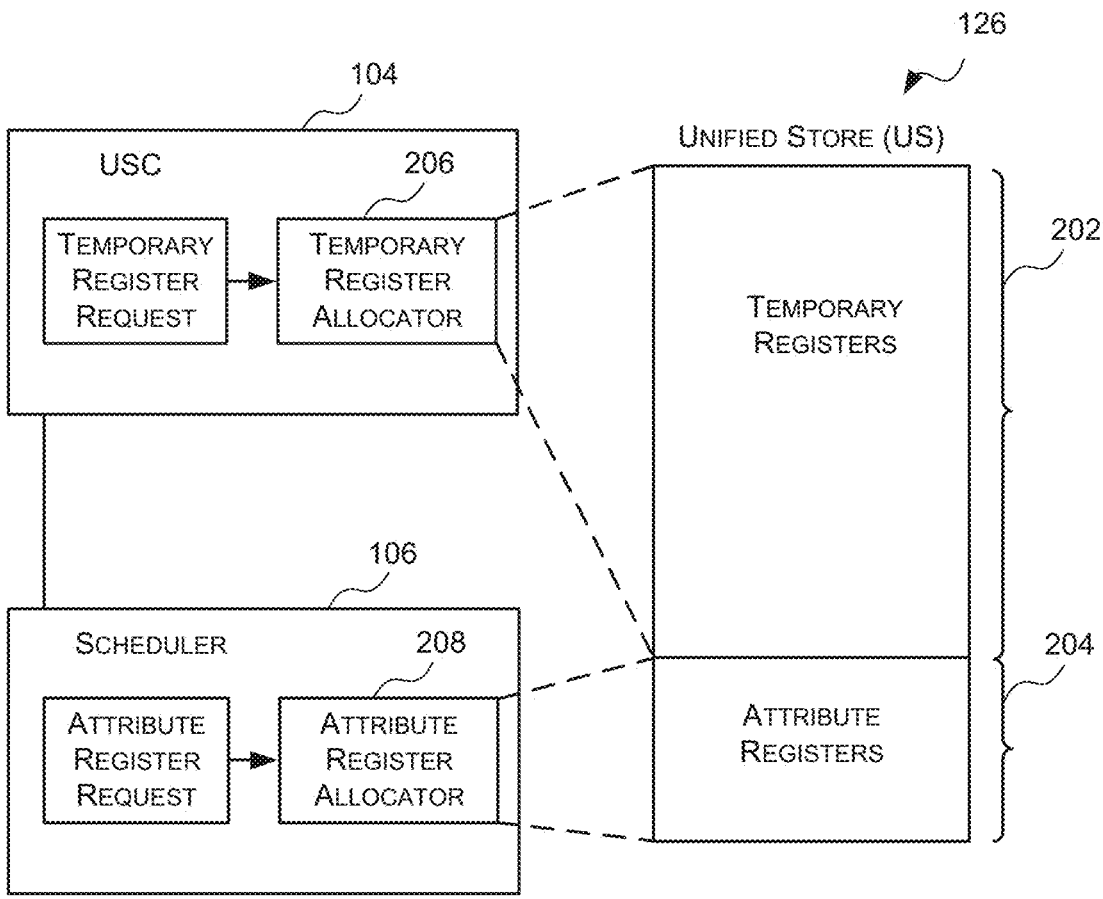
FIG. 2 is a schematic diagram illustrating a first example method of allocating portions of a storage unit to a plurality of tasks to store at least two different types of data.

In one implementation known to the Applicant, which is not an admission that the implementation is well-known or known outside the Applicant company, each US 126 is statically partitioned between the types of data. For example, as shown in FIG. 2, the US 126 may be divided into a first section 202 (which may be referred to as the temporary registers) that is reserved for storing temporary data; and a second section 204 (which may be referred to as the attribute registers) which is reserved for storing attribute data. In the example shown in FIG. 2, the first section 202 is much larger than the second section 204. This allows more pixel shader tasks to run than vertex shader tasks which may be beneficial in some cases. However, it will be evident to a person of skill in the art that this is an example only.

In the example shown in FIG. 2 there is one allocator for each type of data that can be stored in the US 126. Specifically, there is a temporary register allocator 206 in the USC 104 which is configured to receive requests for one or more portions of the US 126 to store temporary data for a task (shown as "temporary register request" in the example of FIG. 2); and an attribute register allocator 208 in the scheduler 106 which is configured to receive requests for one or more portions of the US 126 to store attribute data for a task (shown as "attribute register request" in the example of FIG. 2). The temporary register allocator 206 is configured to receive requests for one or more portions (e.g. registers) of the US 126 for storing temporary data for a task, and allocate the requested portions of the US 126 from the first section 202. Similarly, the attribute register allocator 208 is configured to receive requests for one or more portions (e.g. registers) of the US 126 for storing attribute data for a task, and allocate the requested portions from the second section 204. In this example, to reduce the amount of data that is allocated to a task before that task is ready to be executed a task may be allocated portion(s) of the storage unit for storing attribute data before it is ready to be executed (so that the initialization data etc. can be stored in the storage unit), but the task may only be allocated portion(s) of the storage unit for storing temporary data when it is ready to be executed. Once a task has been allocated the requested portions of the US 126 the task can be executed by the USC 104.

The problem with the known implementation shown in FIG. 2 is that it does not allow efficient or effective use of the US 126 in many situations. For example, when the GPU 100 is running only the geometry processing phase such that each USC 104 is executing mostly vertex shader tasks, the vertex shader tasks can't make effective use of the US 126 for attributes as the attributes are limited to the second section 204 of the US 126. This limits the number of vertex shader tasks that a USC 104 can run in parallel which reduces the efficiency of the GPU 100. Similarly, when the GPU 100 is running only the rasterization phase such that each USC 104 is executing mostly fragment shader tasks, the fragment shader tasks can't make effective use of the US 126 for temporary data as they don't have access to the second section 204 of the US 126 that is reserved for storing attribute data. Depending on how the US is partitioned, this may leave 15-25% of the US unused. This may limit the number of fragment shader tasks that a USC 104 can run in parallel, particularly when the amount of temporary data per fragment shader task is large. Like the geometry processing phase only example, this may reduce the efficiency of the GPU.

Furthermore, in some cases, there may be a maximum number of portions of the US 126 that can be allocated to a task for storing temporary data. This maximum may be set based on the size of the first section 202 of the US 126 reserved for storing temporary data. While a compiler may be configured to attempt to limit the temporary data that a task needs to store to what can be stored in the maximum number of portions, in some cases it may be unavoidable for a task to store more temporary data then can be stored in the maximum number of portions. In such cases, the USC will not be able to allocate enough portions of the US 126 to store the required amount of data which may require the task to store some or all of the data in other memory (e.g. main memory). Each time a task has to use other memory (e.g. main memory) it reduces the efficiency of the GPU. Generally, the higher the maximum number of portions of the US that can be allocated to a task for storing temporary data, the fewer the number of tasks that will have to use memory to store temporary data. Accordingly, increasing the maximum number of portions of the US 126 that can be used to store temporary data can reduce the number of tasks that will have to use other memory (e.g. main memory) to store temporary data, which can improve the performance of the GPU.

Storage units, such as, but not limited to, register files are also expensive in terms of area and power, so it advantageous to maximise their use. Therefore, what is needed is a method of allocating a shared memory to a plurality of tasks for use in storing at least two different types of data that enables efficient use of the storage unit when the amount of the storage unit needed for each type of data is variable.

Accordingly, described herein are methods and allocators for allocating a shared storage unit to a plurality of tasks for use in storing at least two different types of data using virtual partitioning. Specifically, in the methods and allocators described herein there are a plurality of virtual partitionings of the storage unit. Each virtual partitioning allots none, one or more than one portion of the storage unit to each of the at least two types of data. For example, one virtual partitioning may allot 50% of the storage unit to a first type of data and the other 50% of the storage unit to a second type of data; and another virtual partitioning may allot 25% of the storage unit to the first type of data and the remaining 75% of the storage unit to the second type of data. In other words, each virtual partitioning presents a view of the storage unit. Then, when a request is made for one or more portions of the storage unit to store a particular type of data associated with a task, the request is associated with one of the virtual partitionings based on one or more characteristics of the request. The requested portion(s) of the storage unit are then allocated to the task from the none, one, or more than one portion of the storage unit allotted to the particular type of data in the virtual partitioning associated with the request. For example, if a request is received for two registers for storing attribute data for a task and the request is associated with a virtual partitioning that has allotted 25% of a register file to attribute data then those two registers are allocated to the task from that 25% of the register file.

In some cases, the tasks may be generated or initiated by a plurality of task masters (e.g. data masters) and there may be a virtual partitioning for each task master. In these cases, each request may be associated with the virtual partitioning for the data master that initiated the corresponding task. In other cases, the tasks may comprise a plurality of different types of tasks and there may be a virtual partitioning for each type of task. In these cases, each request may be associated with the virtual partitioning for the type of task.

Figure 3:
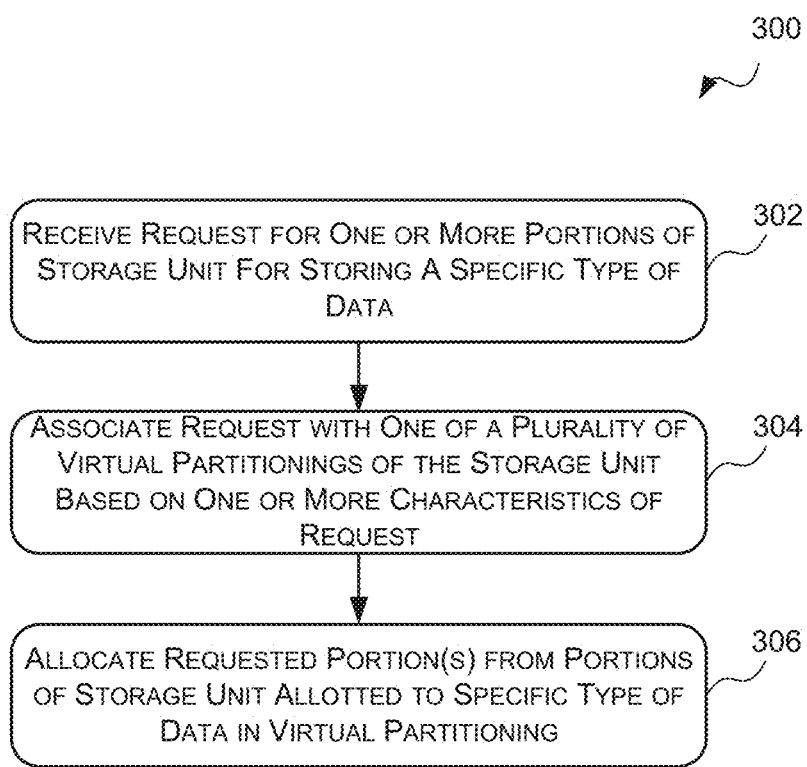
FIG. 3 is a flow diagram of an example method of allocating portions of a storage unit to a plurality of tasks for storing at least two types of data using a plurality of virtual partitionings.

Reference is now made to FIG. 3 which illustrates an example method 300 of allocating one or more portions of a shared storage unit to each of a plurality of tasks for use in storing at least two different types of data. The term "storage unit" is used herein to mean any physical device that is capable of storing electronic data. The term "storage unit" includes, but is not limited to, memory such as random access memory (RAM), a register file, a buffer, and the like. Examples of a storage unit include, but are not limited to, the unified store (US) 126 of FIGS. 1 and 2 and the unified vertex buffer (UVB) 122 of FIG. 1. A portion of a storage unit (which also may be referred to as a region of the storage unit) is a part of the storage unit which can be separately allocated to, and used by, a task to store data. A portion of a storage unit is less than the whole of the storage unit. The size of a portion may be referred to as the allocation granularity. The size of a portion may be expressed in any suitable units (e.g. registers (where the storage unit is a register file), bits, bytes, words, dwords etc). In some cases, each portion of a storage unit may be of the same size. For example, in some cases, the storage unit may be divided into a plurality of equal sized portions which can be separately allocated to a task. Where the storage unit is a register file a portion of the register file may be a single register or multiple registers (e.g. two registers or four registers).

Figure 4:
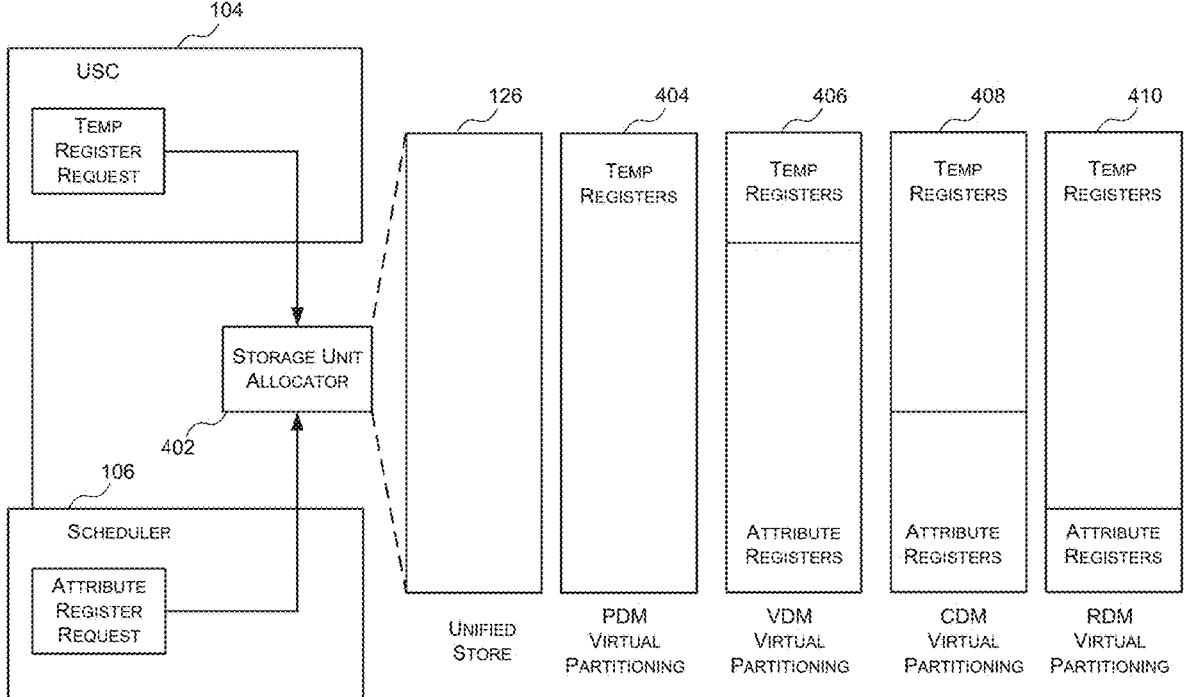
FIG. 4 is a schematic diagram illustrating an example storage unit allocator and example virtual partitionings to implement the method of FIG. 3.

The method 300 begins at block 302 where a request is received at a storage unit allocator, such as the storage unit allocator 402 of FIG. 4, for one or more portions of a storage unit (e.g. US 126) for storing a particular type of data of at least two types of data for a task.

The request may comprise information identifying the number of portions of the storage unit that is being requested. For example, the request may comprise a field, or the like, that indicates the number of portions of the storage unit that is being requested.

The types of data that are stored in the storage unit may be dependent on the location and purpose of the storage unit. For example, if the storage unit is the US 126 of FIGS. 1 and 2, the at least two types of data may comprise temporary data and attribute data. However, in other cases, there may be additional and/or different types of data that are stored in the storage unit. For example, as described in more detail below, if the storage unit is the UVB 122 of FIG. 1 the at least two types of data may comprise transformed geometry data and tessellation factors.

In some cases, the request may comprise information, or may be associated with information (e.g. sideband data), that identifies the type of data the request relates to. For example, where the two types of data are temporary data and attribute data the request may comprise a field, or the like, indicating whether the request relates to temporary data or attribute data. However, in other cases, the type of data the request relates to may be determined from the requestor. Specifically, in some cases there may be a different requestor for each type of data. For example, as shown in FIG. 4, where the storage unit is a US 126 which is configured to store temporary data and attribute data, the scheduler 106 may be configured to receive tasks initiated by data masters (e.g. VDM, DDM) and send requests for registers for storing attribute data for those tasks (shown as "attribute register request" in FIG. 4) to the storage unit allocator 402; and the USC 104 may be configured to receive tasks initiated by the data masters and send requests for registers for storing temporary data for those tasks (shown as "temp register request" in FIG. 4) to the storage unit allocator 402. In this example, the storage unit allocator 402 may be configured to determine that a request received from the scheduler 106 relates to attribute data and a request received from the USC 104 relates to temporary data.

In some cases, the request may comprise, or may be associated with (e.g. sideband data), additional information. For example, where tasks can be initiated by a plurality of different task masters a request may comprise, or may be associated with (e.g. sideband data), information that identifies the task master that initiated the task. For example, where the storage unit is a US 126 the request may comprise information indicating which data master (e.g. VDM 110, CDM 112, RDM 114, DDM 116, PDM 118 or TDM 120) initiated the task. In other examples, where tasks may be a plurality of different types, the task may additionally, or alternatively, comprise, or may be associated with (e.g. sideband data), information that identifies the type of task. For example, where the tasks are shader tasks the request may identify the type of shader task (e.g. vertex shader, domain shader, pixel shader, fragment shader etc.). Once a request has been received, the method 300 proceeds to block 304.

At block 304, the storage unit allocator (e.g. storage unit allocator 402) dynamically associates the request with one of a plurality of virtual partitionings of the storage unit based on one or more characteristics of the request. As described above, each virtual partitioning allots or designates none, one, or more than one portion of the storage unit to each type of data that can be stored in the storage unit. For example, if two types of data can be stored in the storage unit (e.g. a first type of data and a second type of data), a first virtual partitioning of the storage unit may allot 25% of the storage unit to the first type of data and the remaining 75% of the storage unit to the second type of data; a second virtual partitioning may allot 50% of the storage unit to each of the first and second types of data; and a third virtual partitioning may allot 100% of the storage unit to the first type of data and none of the storage unit to the second type of data.

Preferably, each virtual partitioning allots the same section of the storage unit to each type of data. For example, if there are two types of data, preferably, any section of the storage unit that is allotted to the first type of data always starts from the same side of the storage unit (e.g. always the top (e.g. highest address or register number) or always the bottom (e.g. lowest address or register number)), and any section of the storage unit allotted to the second type of data always starts from the other side—e.g. any section of the storage unit allotted to the first type of data may always start from the top (e.g. highest address or register number) of the storage unit and any section of the storage unit allotted to the second type of data may always start from the bottom (e.g. lowest address or register number).

The characteristic(s) of the request that are used to select the virtual partitioning to associate with the request may be dependent on the location of the storage unit, purpose of the storage unit and/or how the allocated portions of the storage unit will be used and released. In some cases, the tasks may be initiated by a plurality of task masters and there may be a virtual partitioning for each task master. In these cases, the virtual partitioning for the task master that initiated the corresponding task is associated with the request. In other words, in these cases, the characteristic of the request that is used to select a virtual partitioning is the task master associated with the corresponding task.

For example, as shown in FIG. 4, where the storage unit is a US 126 of FIG. 1 and the task masters are the data masters of FIG. 1 (e.g. VDM 110, CDM 112, RDM 114, DDM 116, PDM 118, TDM 120) there may be a virtual partitioning 404 for the PDM, a virtual partitioning 406 for the VDM, a virtual partitioning 408 for the CDM, a virtual partitioning 410 for the RDM, a virtual partitioning for the DDM (not shown) and a virtual partitioning for the TDM (not shown). In the example of FIG. 4 the virtual partitioning 404 for the PDM allots 100% of the US 126 to temporary data; the virtual partitioning 406 for the VDM allots the top 25% of the US 126 to temporary data and the remaining 75% to attribute data; the virtual partitioning 408 for the CDM allots the top 60% of the US 126 to temporary data and the remaining 40% to attribute data; and the virtual partitioning 410 for the RDM allots the top 80% of the US 126 to temporary data and the remaining 20% to attribute data. The benefits of these particular virtual partitionings for allocating portions of the US 126 to tasks initiated by the different data masters are described in more detail below.

In other cases, different characteristics of the request may be used to select which of the plurality of virtual partitionings to associate with a request. For example, in some cases, the tasks may comprise a plurality of different types of tasks and there may be a virtual partitioning per type of task. For example, as described in more detail below, where the tasks are shader tasks that are executed in the geometry processing phase such as vertex shader tasks, geometry shader tasks, domain shader tasks and hull shader tasks, there may be a virtual partitioning for each of these types of shader tasks. In these cases, the virtual partitioning for the type of task that the request relates to is associated with the request. In other words, in these cases, the characteristic of the request that is used to select a virtual partitioning is the type of the task. It will be evident to a person of skill in the art that these are examples only and that other characteristics or combinations of characteristics of a request may be used to select an appropriate virtual partitioning for the request.

In some cases, the virtual partitionings may be configurable. For example, in some cases, information may be stored (e.g. in a configuration storage unit) for each virtual partitioning which indicates the allotment of the storage unit to each of the different types of data which can be configured by software (e.g. firmware) or otherwise. Specifically, in some cases, there may be a set of one or more registers for each virtual partitioning that specifies how much (e.g. how many portions) of the storage unit is/are allotted to each type of data. In one example, where there are two types of data, there may be a register per virtual partitioning wherein the first T bits of the register specify the number of portions of the storage unit allotted to the first type of data and the remaining T bits of the register specify the number of portions of the storage unit allotted to the second type of data. T may be based on the size of the register and the number of portions of the storage unit. For example, in some cases, each register may be a 32-bit register and T is equal to 16. Where a virtual partitioning will never allot any of the storage unit to one type of data the portion of the register related to that type of data may not be used. It will be evident to a person of skill in the art that this is an example only and the information about each virtual partitioning may be stored in any suitable manner. One of the advantages of having configurable virtual partitionings is that it is possible to implement an effective static partitioning of the storage unit by configuring all of the virtual partitionings to be the same—which may allow backward compatibility with systems that use a static partitioning.

Where the virtual partitionings are configurable, the storage unit allocator (e.g. storage unit allocator 402) may be configured to associate a request with a virtual partitioning by: selecting one of the plurality of virtual partitionings based on the one or more characteristics of the request; reading the information defining the selected virtual partitioning from the configuration storage unit (e.g. memory or register) to determine how much (e.g. how many portions) of the storage unit is/are allotted to each type of data for the selected virtual partitioning; and identifying the portions of the storage unit allotted to each type of data. The determination of which portions are allotted to each type of data may be based on a known or configurable ordering of the types of data in the storage unit. For example, if the portions allotted to the first type of data start at the top (e.g. highest address, register number or portion number) of the storage unit then the range of portions allotted to the first type of data may be defined by max_first and min_first as set out equations (1) and (2) where K is the number of portions allotted to the first type of data and X is the total number of portions of the storage unit. Similarly, if the portions allotted to the second type of data start at the bottom (e.g. lowest address, register number or portion number) of the storage unit then the range of portions allotted to the second type of data may be defined by max_second and min_second as set out equations (3) and (4) where H is the number of portions allotted to the second type of data.

$$max\_first = X - 1 \qquad (1)$$
$$min\_first = X - K \qquad (2)$$
$$max\_second = H - 1 \qquad (3)$$
$$min\_second = 0 \qquad (4)$$

Example methods for configuring the virtual partitionings for two different example storage units will be described below.

Once one of the plurality of virtual partitionings has been associated with the request, the method 300 proceeds to block 306.

At block 306, the storage unit allocator (e.g. storage unit allocator 402) is configured to allocate the requested portion(s) of the storage unit to the task from the portion(s) of the storage unit allotted to the particular type of data in the virtual partitioning. For example, if the request is for two portions of the US 126 for temporary data for a task initiated by the vertex data master, and there is a virtual partitioning per task master, then the request may be associated with the virtual partitioning for the vertex data master. Where the virtual partitioning for the vertex data master is as shown in FIG. 4 at 406 where the top 25% of the storage unit is allotted to temporary data and the bottom 75% of the storage unit is allotted to attribute data, the storage unit allocator (e.g. storage unit allocator 402) may be configured to allocate the requested two portions of the storage unit from the 25% of the storage unit (US 126) allotted to temporary data.

Similarly, if the request is for six portions of the US 126 for attribute data for a task initiated by the compute data master and there is a virtual partitioning per task master, then the request may be associated with the virtual partitioning for the compute data master. Where the virtual partitioning for the compute data master is as shown in FIG. 4 at 408 where the top 60% of the storage unit is allotted to temporary data and the bottom 40% of the storage unit is allotted to attribute data, the storage unit allocator (e.g. storage unit allocator 402) may be configured to allocate the requested six portions of the storage unit from the 40% of the storage unit (US 126) allotted to attribute data.

Allocating the requested portions from the portions allotted to the relevant type of data may first comprise determining if there are enough free or un-allocated portions of the allotted portion(s) to fulfil the request. For example, if the request is for two portions for temporary data, but there is only one unallocated portion in the 25% of the storage unit allotted to temporary data, then the storage unit allocator cannot fulfil the request and the storage unit allocator may stall the request. If, however, the request is for two portions of the storage unit for temporary data, and there are four unallocated portions of the storage unit in the 25% allocated to temporary data then the storage unit allocator can fulfil the request. So the storage unit allocator selects two free or available portions in that 25%, and allocates those two portions to the task.

In some cases, the storage unit allocator (e.g. storage unit allocator 402) may be configured to process requests related to the same type of data in order (e.g. in the order in which they are received), but the storage unit allocator may be able to process requests related to different types of data out of order. For example, where the two types of data are temporary data and attribute data, the storage unit allocator may be configured to process requests for portions of the storage unit to store temporary data in the order which they are received, and process the requests for portions of the storage unit to store attribute data in the order in which they are received. In some cases, to implement this, the storage unit allocator may comprise a queue for each type of request and may store and process the requests in each queue in order. However, if a request is stalled (e.g. because a request cannot be fulfilled), the storage unit allocator may be configured to attempt to fulfil a request for portions of the storage unit for the other type of data. For example, if the storage unit allocator cannot fulfil a request for one or more portions of the storage unit to store temporary data, the storage unit allocator may attempt to fulfil the next request for one or more portions of the storage unit to store attribute data (and vice versa). Where the different types of requests are made by different requestors, as shown in FIG. 4, then the storage allocator may implement this by processing requests from each requestor in order, and if it cannot fulfil a request from one requestor, attempt to fulfil the next request from the other requestor.

When the storage unit allocator is configured in this manner the storage unit allocator may be described as being non-blocking. Configuring the storage unit to be non-blocking ensures that the storage unit allocator does cause deadlock by stalling until it can fulfil a request for the first type of data (e.g. attribute data). For example, if the storage unit allocator were configured to process all requests in the order in which they were received (regardless of type), it is possible for there to be a continuous stream of requests for portions of the storage unit for storing the first type of data (e.g. attribute data) thereby consuming the section of the storage unit allotted for storing the first type of data (e.g. attribute data). Then, if the storage unit allocator receives another request for portions of the storage unit for storing the first type of data (e.g. attribute data), the storage unit allocator may not be able to fulfil that request until portions of the storage unit are released—and portions of the storage unit will only be released if a task is allocated portions of the storage unit for storing the second type of data (e.g. temporary data) and then executed by a USC. This would result in deadlock.

The method of allocating portions of a shared storage unit using virtual partitionings described with respect to FIG. 3 may be used to allocate portions of any shared storage unit that is used to store multiple types of data and the amount of the storage unit required for each type of data is variable. Described below is: (1) an example implementation of the method of FIG. 3 to allocate portions of a unified store (US) of the GPU of FIG. 1 to shader tasks; and (2) an example implementation of the method of FIG. 3 to allocate portions of a unified vertex buffer (UVB) of a GPU to geometry processing phase shader tasks. However, it will be evident to a person of skill in the art that these are examples only and that the use of the described method is not limited to USs or UVBs, nor is it limited to storage units that form part of a GPU.

Allocation of Unified Store

As described above, one of the problems with statically partitioning a US 126 of FIG. 1 between attribute data and temporary data is that the US 126 cannot be efficiently or fully used in some situations or under some operating conditions. For example, when the GPU 100 is running only the geometry processing phase such that each USC 104 is executing mostly vertex shader tasks, the vertex shader tasks can't make effective use of the US 126 for attributes as attributes are limited to the second section 204 of the US 126. This limits the number of vertex shader tasks that a USC 104 can run in parallel which reduces the efficiency of the GPU 100. Similarly, when the GPU 100 is running only the rasterization phase such that each USC 104 is executing mostly fragment shader tasks, the fragment shader tasks can't make effective use of the US 126 for temporary data as they don't have access to the second section 204 of the US 126. This may limit the number of fragment shader tasks that a USC can run in parallel, particularly when the amount of temporary data per fragment shader task is large. Like the geometry processing phase only example, this may reduce the efficiency of the GPU.

The Applicant submits that more efficient and/or effective use of the US 126 can be achieved by allocating portions of the US 126 to shader tasks using the virtual partitioning method of FIG. 3 wherein there is a virtual partitioning per task master (e.g. data master). Specifically, since the task masters (e.g. data masters) are independent this can be exploited to create independent views of the US 126—e.g. it allows each task master (e.g. data master) to be provided with a favourable view of the US 126.

For example, since the pixel data master tasks only store temporary data (not attribute data) the virtual partitioning for the pixel data master may be configured to allot all of the storage unit to temporary data (and none of the storage unit to attribute data); and since vertex data master tasks store both attribute data and temporary data the virtual partitioning for the vertex data master may allot one or more portions of the US 126 to attribute data and one or more portions of the US 126 to temporary data, but since vertex data master tasks typically store more attribute data than temporary data, more portions of the US 126 may be allotted to attribute data than to temporary data. Using such virtual partitionings allows the pixel data master tasks to use the whole US 126 for temporary data when only pixel data master tasks are running, and allows the vertex data master tasks to use more of the US 126 for attribute data when only vertex data master tasks are running in comparison to the static partitioning scheme described above. When both pixel data master tasks and vertex data master tasks are running the two data masters contend for the same portions of the US 126.

In general, the virtual partitioning for each data master may be configured such that a portion of the US 126 is allotted to each type of data that tasks for the data master will store. For example, if tasks generated by one data master store both attribute data and temporary data, then at least one portion of the US 126 is allotted to attribute data and at least one portion of the US 126 is allotted to temporary data; and if tasks generated by another data master store only temporary data, then at least one portion of the US 126 is allotted to temporary data, but none of the US 126 may be allotted to attribute data.

In some cases, further restrictions may be placed on the virtual partitionings to avoid deadlock. Specifically, in some cases, further restrictions may be placed on the virtual partitionings where there is a lag or delay in time between a request being made for portion(s) of the US 126 for a first type of data (e.g. attribute data) for a task; and a request being made for portions(s) of the US 126 for a second type of data (e.g. temporary data) for the same task. For example, as described above, some tasks (e.g. tasks initiated by the vertex data master, compute data master, ray tracing data master and domain data master) store both attribute data and temporary data, but the request for portion(s) of the US 126 for storing attribute data for a task is made before the request for portion(s) of the US 126 for storing temporary data. Specifically, when one of these data masters is ready to initiate a task, the data master sends the task to the scheduler 106. The scheduler 106 then sends a request to the storage unit allocator 402 for one or more portions of the US 126 for storing attribute data for the task. After the task has been allocated the requested portion(s) of the US for storing attribute data, the task is sent or issued to the USC 104. The USC 104 then sends a request to the storage unit allocator 402 for one or more portions of the US 126 for storing temporary data for the task. Once the task has been allocated the requested portion(s) of the US for storing temporary data, the task can be executed by the USC. Since there is a delay in time between a task being allocated portion(s) of the US for storing attribute data and requesting portion(s) of the US for storing temporary data, it is possible for a data master (e.g. vertex data master) to send a number of tasks to the scheduler and for each of those tasks to be allocated portion (s) of the US 126 for storing attribute data before the USC 104 makes a request for portion(s) of the US 126 for storing temporary data for any of the tasks. If, however, those tasks have been allocated all of the US 126 for attribute data then those tasks will not be able to complete as there will not be enough free portions of the US for storing the temporary data for even one of the tasks. This issue may be referred to herein as intra-data master dependency.

Figure 5:
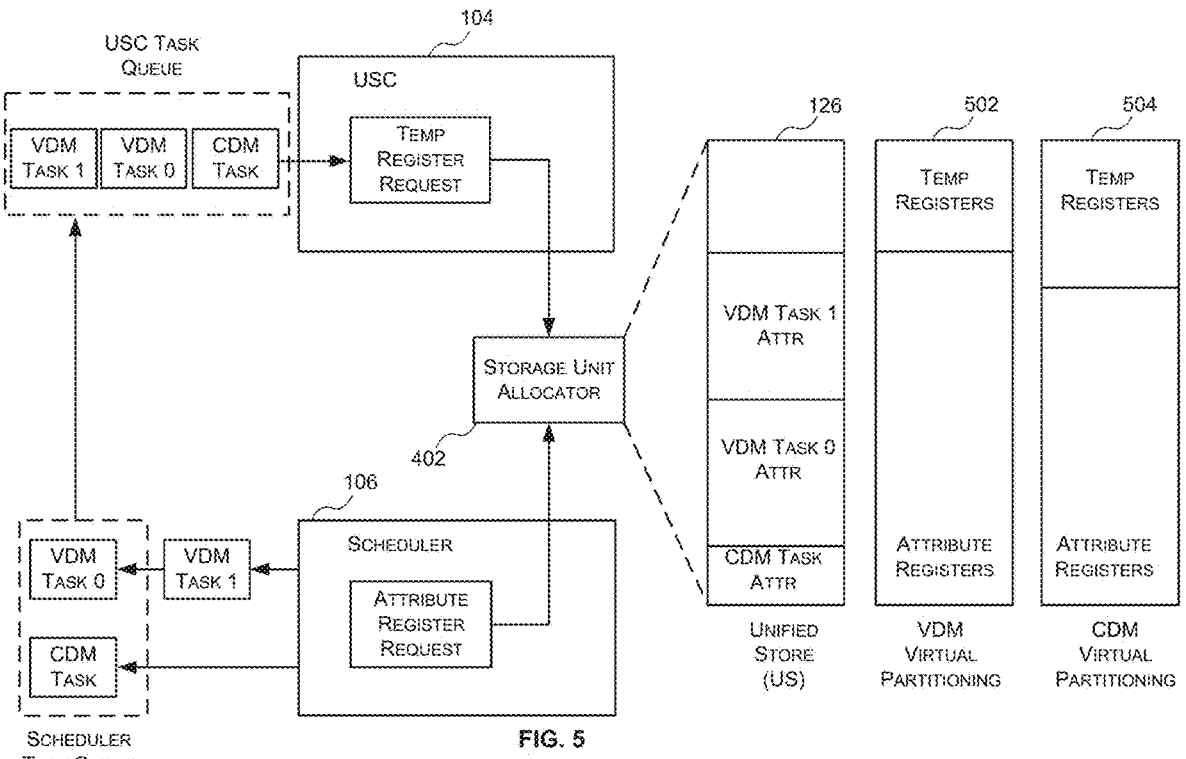
FIG. 5 is a schematic diagram illustrating inter-data master dependency.

This issue may be avoided by configuring each virtual partitioning so that a sufficient number of portions of the US 126 is allotted to the second type of data (e.g. temporary data) to allow at least one task of the corresponding data master to be executed if the task is allocated portion(s) of the US 126 for the first type of data (e.g. attribute data). For example, where there is a maximum number of portions of the US 126 that a task initiated by a data master may request for the second type of data (e.g. temporary data), then the virtual partitioning for that data master may be configured to allot at least the maximum number of portions of the US 126 to the second type of data (e.g. temporary data). This ensures that the data master cannot stop its own tasks from being executed by consuming too many portions of the US 126 for the first type of data (e.g. attribute data). For example, if the maximum number of registers a VDM task will use for temporary data is 20, then the virtual partitioning for the VDM may allot at least 20 registers of the US to temporary data.

Where there is a delay between requesting portion(s) of the US for first and second types of data, configuring the virtual partitioning for each data master so that there is a sufficient number of portions of the US allotted to each type of data master to execute at least one task initiated by that data master may not be sufficient in some cases to avoid deadlock. For example, this may not be sufficient to avoid deadlock if the tasks can be executed out of order and different data masters have a different maximum number of portions of the US 126 they will request for the second type of data (e.g. temporary data). This potential issue will be explained by reference to FIG. 5. In this example, a VDM initiated task will request a maximum of 25% of the US 126 for storing temporary data so (to address the intra-data master dependency issue) the virtual partitioning 502 for the VDM allots the top 25% of the US to temporary data and the remaining 75% of the US to attribute data; and a CDM initiated task will request a maximum of 30% of the US 126 for storing temporary data so (to address the intra-data master dependency issue) the virtual partitioning 504 for the CDM allots 30% of the US 126 to temporary data and the remaining 70% of the US 126 to attribute data. In this example there are two VDM tasks (VDM task 0 and VDM task 1) and a CDM task which are sent to the scheduler 106. Each of these tasks are allocated one or more portions of the US 126 for storing attribute data before any of the tasks are allocated portions of the US 126 for storing temporary data. In this example, while the scheduler 106 is configured to send the tasks for the same data master in order to the USC 104 (e.g. the scheduler 106 is configured to send VDM task 0 to the USC 104 before VDM task 1) the scheduler 106 may be able send the tasks from different data masters out of order. For example, even if the CDM task was received at the scheduler 106 after the VDM tasks, the scheduler 106 may send the CDM task to the USC 104 before the VDM tasks.

Where the USC 104 is configured to execute the tasks it receives in order, if the CDM task arrives at the USC 104 before the VDM tasks the USC must execute the CDM task before it can execute the VDM tasks. However, if the CDM task requires 30% of the US for storing temporary data, because the three tasks have been allocated so much of the US 126 for attribute data, there are not enough free portions of the US 126 for the CDM task to store its temporary data, and no more portions of the US 126 will be released because the tasks that have been allocated the remaining portions of the US 126 (i.e. VDM tasks 0 and 1) are stuck behind the CDM task. Accordingly, the USC 104 becomes deadlocked. This issue may be referred to herein as inter-data master dependency.

This issue may be avoided by further restricting the virtual partitioning for each data master such that, where each data master has a maximum number of portions of the US 126 any of its tasks will request for the second type of data (e.g. temporary data), no virtual partitioning allots more than X−M portions to the first type of data (e.g. attribute data) where X is the total number of portions in the storage unit (e.g. US 126) and M is the largest of the maximum number of portions that will be requested for the second type of data (e.g. temporary data). For example, if VDM tasks use a maximum of 20 registers for temporary data, DDM tasks use a maximum of 25 registers for temporary data, CDM tasks use a maximum of 15 registers for temporary data and RDM tasks use a maximum of 40 registers for temporary data, then each virtual partitioning may be configured to allot no more than X−40 partitions to attribute data. This effectively caps the number of portions that can be allocated to attribute data to X−M. The difference between the cap and the total number of portions is referred to as the guaranteed number of temporary portions G (which is M in this example).

As described above, in some cases, the virtual partitionings may be configurable. For example, there may be a set of one or more registers for each virtual partitioning that indicates how much of the storage unit is allotted to each type of data. In some cases, the virtual partitionings may be dynamically configurable—i.e. they may be re-configured or adjusted during operation or while a task related to the corresponding data master is currently being executed. For example, in some cases, it may be advantageous to have a default configuration for each virtual partitioning which is used in most cases, but allow for one or more virtual partitionings to be dynamically adjusted to allow for, or to accommodate, unusual or rare circumstances. In these cases, the virtual partitionings may be initially configured with the corresponding default configuration and then in response to one or more trigger events one or more of the virtual partitionings may be dynamically reconfigured.

For example, in some cases, most tasks may request Q portions or less of the US 126 for storing temporary data, but there may be a few tasks which may request more than Q portions of the US 126 for storing temporary data. It may be advantageous to operate most of the time with virtual partitionings that are configured to guarantee Q temporary portions, and when a task arises that requires more than Q portions for storing temporary data, adjust the virtual partitions to temporarily guarantee more than Q temporary portions. Dynamically adjusting the virtual partitionings to accommodate occasional tasks that require a large number of portions of the US for temporary data, instead of maintaining a higher guaranteed number of temporary portions all the time, permits more of the US to be used for attribute data most of the time, which may increase the performance and/or efficiency of the GPU. Specifically, if a storage unit has 40 portions and most tasks request 5 portions or less for storing temporary data but some tasks may request up to 30 portions for storing temporary data, instead of reserving 30 portions of the storage unit for temporary data to ensure any task can get up to 30 portions of the storage unit for temporary data (leaving only 10 portions for attribute data (if required)), most of the time only 5 portions of the storage unit will be reserved for temporary data (leaving 35 portions for attribute data (if required)). Dynamically adjusting the virtual partitionings in this manner may also increase the maximum number of portions that can be allocated to any task for storing temporary data to the number of portions of the storage unit, which, as described above, can reduce the number of tasks which have to use other memory (e.g. main memory) for storing temporary data.

Accordingly, in some cases, there may be a default guaranteed number of temporary portions D (which may be less than the maximum number of portions of the US any of the tasks may request), and the default configuration for each virtual partitionings may be such that no more than X–D portions of the storage unit are allotted to attribute data. The default guaranteed number of temporary portions may be selected to accommodate most tasks (e.g. a threshold percentage of tasks). Then, if a task arises that requires more than the default guaranteed number of temporary portions, one or more virtual partitionings may be adjusted to guarantee a higher number of temporary portions.

For example, it may be possible for some compute data master tasks to require a large number of portions of the US to be allocated for storing temporary data at the same time. For example, the compute data master may be able to initiate tasks that require a large number of portions of the US for storing temporary data; or the compute data master may be able to initiate a compute workgroup comprising a set of one or more tasks with a barrier, and the set of tasks of the workgroup may collectively require a large number of portions of the US for storing temporary data. A compute workgroup is a feature of multiple application programming interfaces (APIs) that let a collection of threads/instances cooperatively work on a data set. If a compute kernel contains a barrier instruction, all threads/instances in the workgroup must reach the barrier instruction before any thread/instance is allowed to proceed. Accordingly, it is advantageous to have the tasks of a workgroup execute concurrently. In order to guarantee that all the tasks in a workgroup with a barrier are able to execute concurrently, the portions of the US to store temporary data for each task in the workgroup are allocated at the same time. So, even if each individual task does not require more than the default guaranteed number of temporary portions, collectively the tasks in the workgroup may require more than the default guaranteed number of temporary portions. For example, if the default guaranteed number of temporary portions is 10 and there is a workgroup comprising four tasks and each task requires 5 portions of the US for storing temporary data, even though each task does not exceed the default guaranteed number of temporary portions, collectively the tasks of the workgroup require 20 portions of the US for storing temporary data. Since in this example the virtual partitionings may only be configured to guarantee 10 portions of the US for temporary data it cannot be guaranteed that 20 portions of the US will ever be free together for storing temporary unless the virtual partitionings are adjusted.

In these cases, the compute data master may be configured to, before it initiates a task (e.g. sends a task to the scheduler), determine whether the task requires more than the default guaranteed number of temporary portions to be allocated for storing temporary data at the same time before it can be executed (e.g. because the task itself requires more than the default guaranteed number of temporary portions or the task is part of a group (e.g. workgroup) which collectively require more than the default guaranteed number of temporary portions be allocated for storing temporary data at the same time). Such a task may be referred to herein as a large temporary data task. If the compute data master determines that the task is a large temporary data task, then the compute data master may be configured to adjust the virtual partitionings of one or more data masters to ensure that enough portions of the US will free up to allow the task (or group of tasks) to be executed. Once the relevant virtual partitionings have been adjusted, the compute data master may send the large temporary data task to the scheduler.

In some cases, adjusting the virtual partitioning of the one or more data masters to ensure that enough portions of the US will free up to allow a large temporary data task to be executed may comprise adjusting the virtual partitionings so that no virtual partitioning allots more than a threshold amount of portions to attribute data. For example, if the default guaranteed number of temporary portions is 10, and a compute data master task requires 20 portions of the US for storing temporary data then the compute data master may be configured to adjust any virtual partitioning that allots at least one portion of the US to attribute data so that each of those virtual partitionings allots no more than X–20 portions of the US to attribute data wherein X is the total number of portions of the US. For example, if the VDM, DDM, CDM and RDM are configured to initiate tasks that store attribute data then the default virtual partitioning for each of those data masters may allot at least one portion of the US to attribute data. In this example, if the compute data master identifies a large temporary data task, the compute data master may be configured to dynamically adjust the configuration of the virtual partitionings for the VDM, DDM, CDM and RDM so that none of these virtual partitionings allot more than X–R portions of the USC to attribute data, where X is the total number of portions of the US and R is the number of portions to be allocated to temporary data for the task to be able to execute and R>default guaranteed number of temporary portions (D). In some cases, the number of portions allotted to temporary data in each of these cases may not be adjusted—e.g. in some examples the number of portions of the US allotted to attribute data may be reduced but the number of portions of the US allotted to temporary data may not be increased. Furthermore, the virtual partitionings for the other data masters (e.g. the PDM and the TDM) may not be adjusted. The adjustment ensures that there will not be a number of other tasks after the compute task in the USC queue that are holding on to a significant number of portions of the US for attribute data which block the compute task from being able to obtain R portions of the US for storing temporary data. Where the configuration for each virtual partitioning is stored in memory (e.g. in a set of one or more registers) as one or more values, the configuration of a virtual partitioning may be adjusted by updating the stored values for that virtual partitioning. In some cases, once the virtual partitionings have been adjusted, the compute data master may send the task to the scheduler 106.

In some cases, it may be possible for a task from the compute data master to be sent to the scheduler after tasks from one or more other data masters have been allocated portions of the US for storing attribute data under the default configurations, but before the tasks from the other data master(s) have been allocated portions of the US for storing temporary data. In these cases, it may be possible for deadlock to occur if a large temporary data compute task is sent to the USC before the other tasks, and the other tasks have been allocated so much of the US for storing attribute data that there are not enough free portions of the US for the compute task to store its temporary data. Specifically, the USC will not be able to execute the compute data master task because it will be unable to obtain enough portions of the US for storing temporary data for the compute data master task, and the other tasks (which could free up portions of the US) are stuck behind the compute data master task. To ensure that this does not occur, the compute data master may be configured to, after it has identified a large temporary data task, determine whether any of the other data masters which initiate tasks that store attribute data (which may be referred to as the attribute data masters) currently have any tasks in-flight with the USC. A task may be in-flight with a USC if the task has been initiated by a data master (e.g. sent to the scheduler), but has not been executed by the USC 104. If it is determined that at least one attribute data master has at least one task in-flight, then the compute data master may be configured to wait until any in-flight attribute data master tasks have been executed before adjusting the relevant virtual partitionings and issuing the task to the scheduler.

In some cases, the compute data master (or another component) may be configured to set the virtual partitionings back to their default configurations after the large temporary data compute task has been executed. There is no danger of a deadlock occurring as a result of increasing the amount of the US that is allotted to attribute data by any virtual partitioning, so the virtual partitionings may be set back to their default configurations as soon as the task has been executed.

Figure 6:
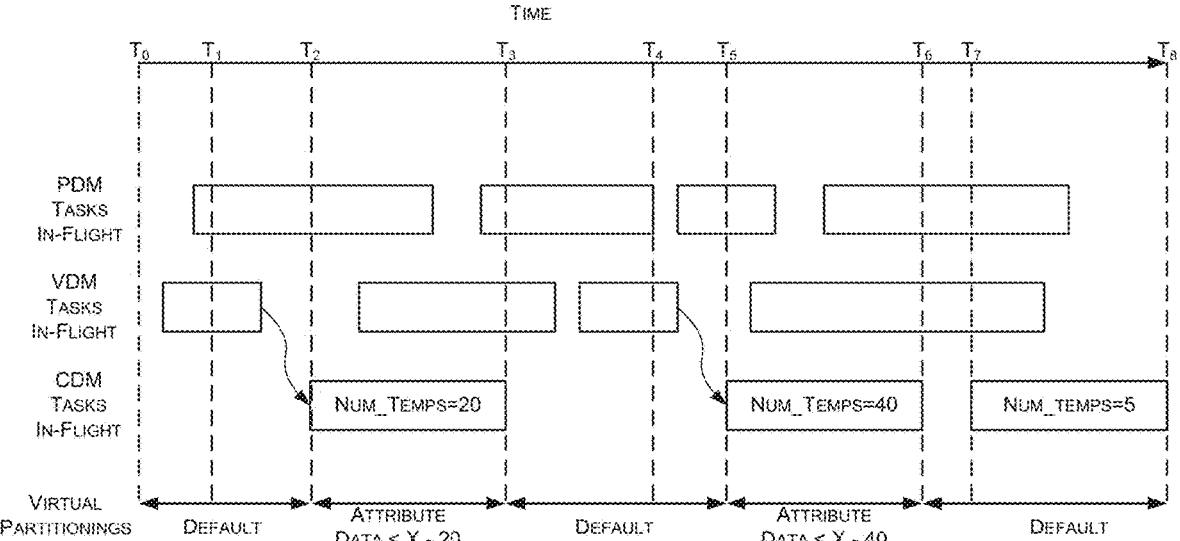
FIG. 6 is a schematic diagram illustrating an example scenario in which one or more virtual partitionings are dynamically adjusted to accommodate a large temporary data task.

Reference is now made to FIG. 6 which illustrates an example scenario in which the virtual partitionings may be dynamically adjusted to accommodate a large temporary data compute data master (CDM) task. In this example, the system starts at time $T_0$ with each of the virtual partitionings having their default configuration wherein each virtual partitioning allots no more than X–10 portions of the US to attribute data. Accordingly, the default guaranteed number of temporary portions is 10. At time $T_1$ the compute data master wants to initiate a large temporary data task (e.g. a task that requires 20 portions of the US for storing temporary data). However, at time $T_1$ the VDM has one or more tasks in-flight so it is not safe to adjust the virtual partitions at this point. So, the compute data master waits or stalls until the VDM in-flight tasks have been executed or completed, and then at time $T_2$ the compute data master dynamically reconfigures the virtual partitionings for the attribute data masters (e.g. the VDM, CDM, RDM and DDM) so that each of these virtual partitionings allot no more than X–20 portions of the US to attribute data (wherein X is the total number of portions of the US), and initiates the large temporary data task (e.g. sends the task to the scheduler). It is noted that since PDM tasks do not store attribute data the compute data master does not have to wait or stall until the in-flight PDM tasks are executed or completed. Once the large temporary data compute data master task has been executed or completed at $T_3$, the virtual partitionings are set back to their default configurations (e.g. configured to guarantee 10 temporary portions for temporary data). It is noted that although there are VDM tasks in flight at time $T_3$, the compute data master does not have to wait for them to be executed or completed before setting the virtual partitionings back to the default configurations.

Then at time $T_4$ the compute data master wants to initiate a second large temporary data task (e.g. a task that requires 40 portions of the US for storing temp data). However, at time $T_4$ the VDM has one or more tasks in-flight so it is not safe to adjust the virtual partitionings at this point. So, the compute data master waits until the VDM in-flight tasks have been executed or completed, and then at time $T_5$ dynamically reconfigures the virtual partitionings for the attribute data masters (e.g. the VDM, CDM, RDM and DDM) so that each of them allot no more than X–40 portions of the US to attribute data (wherein X is the total number of portions of the US), and initiates the second large temporary data task (e.g. sends the task to the scheduler). Once the large temporary data task has been executed or completed at time $T_6$, the virtual partitionings are set back to their default configurations. It is noted that although there are VDM tasks in flight at time $T_6$ the compute data master does not have to wait for them to be executed or completed before setting the virtual partitionings back to the default configurations.

Then at time $T_7$ the compute data master wants to initiate a regular temporary data task (e.g. a task that requires less than the default guaranteed number of temporary portions). Since the task is a regular temporary data task the compute data master does not have to wait for any other in-flight tasks to be executed or completed so the task is initiated at time $T_7$ and the virtual partitionings are not changed (i.e. the virtual partitionings continue to have their default configurations).

It will be evident to a person of skill in the art that this is an example only and that other data masters or task masters may be able to initiate tasks that require more than the default number of portions of the US for storing the second type of data (e.g. temporary data).

Although it has been described above that a data master (e.g. the compute data master) may adjust the virtual partitioning for one or more data masters when a trigger event occurs (e.g. when the data master detects a large temporary data task), in other examples another component or unit of the GPU may be responsible for adjusting the virtual partitionings when a trigger event occurs. For example, where a GPU comprises a firmware processor, such as the firmware processor 121 described above with respect to FIG. 1, that is responsible for causing the data masters to issue tasks to the scheduler 106, it may be the firmware processor 121 that adjusts the virtual partitionings when a trigger event occurs. For example, in some cases, the driver of the host computer (e.g. CPU) supplying the geometry data may be configured to notify the firmware processor 121 if a control stream is associated with a large temporary data task. Then, when the firmware processor 121 receives a control stream that is identified as being associated with a large temporary data task, the firmware processor 121 may be configured to: (i) defer processing of the control stream by the corresponding data master until there are no attribute data master tasks in flight (e.g. no active geometry processing phases, and no ray tracing processing phases active); and (ii) prior to causing the data master to process the control stream, dynamically adjust the configuration of the virtual partitionings for the VDM, DDM, CDM and RDM so that none of these virtual partitionings allot more than X–R portions of the USC to attribute data, where X is the total number of portions of the US and R is the number of portions to be allocated to the large temporary data task. In this example, it is the driver of the host computer (e.g. CPU) that is configured to calculate the number of temporary registers that will be required for individual tasks and for workgroups (e.g. workgroups with a barrier) associated with a control stream and determine whether this number exceeds the default guaranteed number of temporary portions D.

It will be evident to a person of skill in the art that the unified store is only an example storage unit and the same method and techniques for allocating portions of a storage unit described above with respect to the unified store may be applied to other storage units which are used to store at least two types of data for tasks initiated by different task masters, and specifically to storage units in which there is a separation in time from when a request is made for portions of the storage unit for a first type of data and when a request is made for portions of the storage unit for a second type of data.

Allocation of Unified Vertex Buffer

As described above with respect to FIG. 1, a GPU 100 may run one or more shaders on the received geometry data in the geometry processing phase. For example, the received geometry data may be divided into a number of draw calls and different shaders can be invoked in the geometry processing phase for different draw calls. Generally, a vertex shader (VS) is invoked for each draw call, a geometry shader (GS) may or may not be invoked for a draw call, and if tessellation is enabled for a draw call a hull shader (HS) and a domain shader (DS) are also invoked. In some cases, the VS is invoked first, followed by the HS (if tessellation), DS (if tessellation), and GS (if geometry shading is enabled). In some cases, the VS and HS (if tessellation is enabled) are invoked by the vertex data master; the DS (if tessellation is enabled) is invoked by the domain data master; and the geometry shader (if geometry shading is enabled) is invoked by the vertex data master if tessellation is not enabled, and by the domain data master if tessellation is enabled. This is illustrated in Table 1.

TABLE 1

| Tessellation Enabled? | Geometry Shader Enabled? | VDM | DDM |
|---|---|---|---|
| No | No | VS | — |
| No | Yes | VS + GS | — |
| Yes | No | VS + HS | DS |
| Yes | Yes | VS + HS | DS + GS |

24

In the example GPU 100 of FIG. 1 the output of the last shader run in the geometry processing phase (which may be referred to as geometry data or transformed geometry data) is stored in a shared storage unit, which may be referred to as the unified vertex buffer (UVB) 122. For example, where neither tessellation nor geometry shading is enabled, the vertex shader is the last shader run in the geometry processing phase and the output of the vertex shader is stored in the UVB; where geometry shading is enabled then the geometry shader is the last shader run in the geometry processing phase and the output of the geometry shader is stored in the UVB; and where tessellation is enabled, but geometry shading is not enabled, then the output of the domain shader is the last shader run in the geometry processing phase and the output of the domain shader is stored in the UVB 122.

Figure 7:
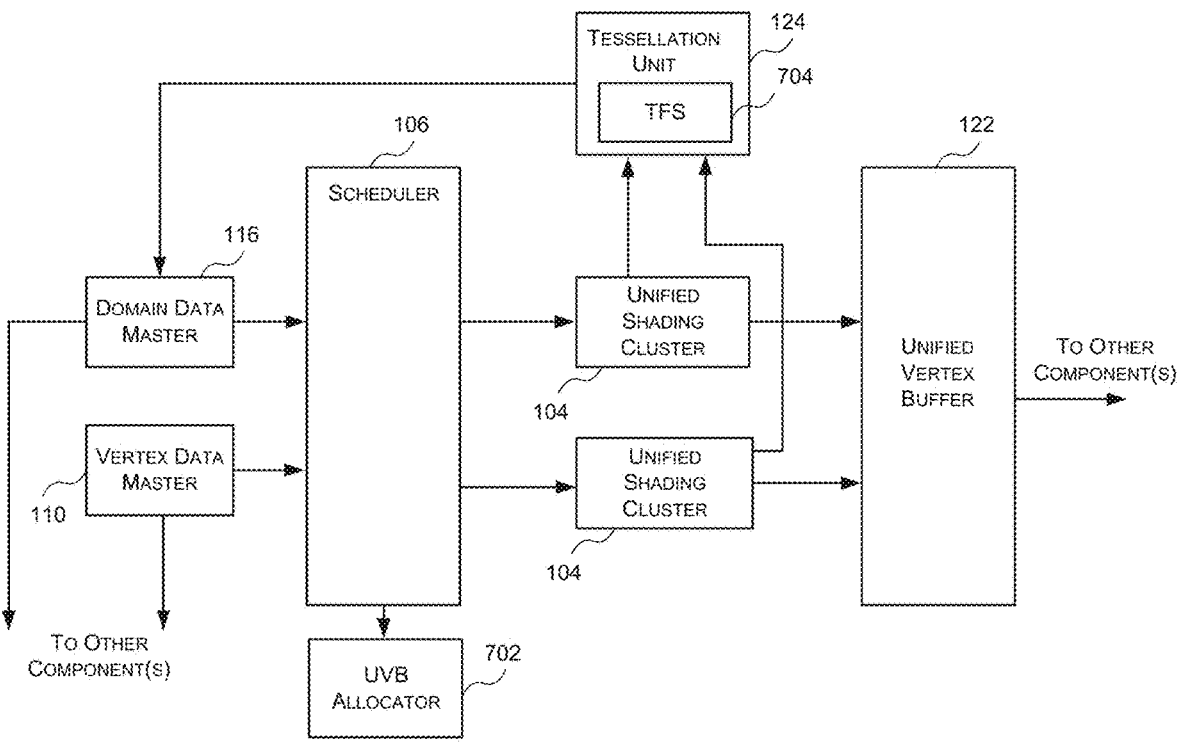
FIG. 7 is a block diagram of part of the graphics processing unit of FIG. 1 comprising a unified vertex buffer configured for storing transformed geometry data and a tessellation factor store for storing tessellation factors.

Accordingly, any task related to the last shader of the geometry processing phase may require one or more portions of the UVB for storing the output thereof (e.g. the geometry data or the transformed geometry data). For example, as shown in FIG. 7, the vertex data master 110 and domain data master 116 may be configured to initiate or invoke geometry processing stage shader tasks (e.g. VS, GS, HS, or DS shading tasks) by sending them to the scheduler 106. If the initiated or invoked task relates to the last shader in the geometry processing phase for a draw call, then the scheduler 106 may send a request to a UVB allocator 702 for one or more portions of the UVB 122 for storing the output data of the task. After a task has been allocated the requested portions of the UVB 122 the task can be issued to the USC where it will be executed.

As is known to those of skill in the art, tessellation is used to calculate a more detailed surface from an original surface. In other words, tessellation allows a lower detail model to be used to generate a higher detail image. If tessellation is enabled for a draw call (a set of geometry data) the HS generates tessellation factors which are provided to a tessellation unit 124. The tessellation unit 124 then tessellates one or more patches based on the tessellation factors and the DS generates the position of the vertices in the tessellation unit 124 output. Accordingly, the domain data master 116 is configured to receive the output of the tessellation unit and invoke or initiate a domain shader to calculate the position of the vertices in the tessellation unit output. In one implementation which is known to the Applicant (and shown in FIG. 7), which is not an admission that it is well-known, or even known outside the Applicant company, the tessellation unit 124 comprises a separate storage unit, referred to as the tessellation factor store (TFS) 704 for storing the tessellation factors generated by a HS task. Accordingly, in this implementation the USCs 104 write the output of a HS task directly to the TFS 704.

Figure 8:
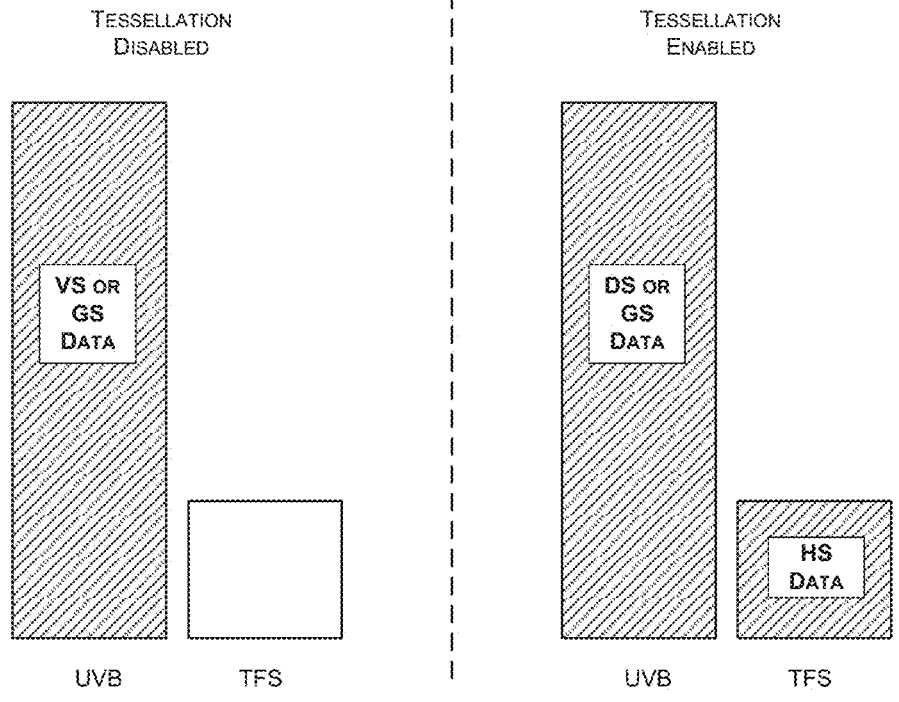
FIG. 8 is a schematic diagram illustrating use of the unified vertex buffer and the tessellation factor store of FIG. 7 when tessellation is enabled and when tessellation is not enabled.

One of the problems, however, with storing the tessellation factors and geometry data in separate storage units is that it does not allow efficient use of the geometry processing phase storage unit resources in many circumstances or operating states. For example, as shown in FIG. 8, when tessellation is disabled a HS is not invoked (and thus there are no tessellation factors) and so the TFS is not used; and when tessellation is enabled the TFS 704 is being used, but it can only be used by HS tasks to store tessellation factors. So, if there are only a few HS tasks running due to other resource constraints, for example, at least a portion of the TFS 704 may remain unused. Since tessellation is not used for many applications the TFS often remains idle or unused. Where the UVB is 72 KB and the TFS is 28 KB that leaves 28% of the available storage unused.

The inventor has identified that the storage capacity of the geometry processing phase can be more effectively used if there is a single storage unit for storing transformed geometry data output by VS, GS or DS tasks, and tessellation factors output by HS tasks. This is particularly true if the VS, GS, DS and HS tasks are allocated portions of the combined storage unit in accordance with the virtual partitioning method 300 of FIG. 3 where there is a virtual partitioning for each type of task (VS, GS, DS and HS) that allots none, one, or more than one portion of the combined storage unit to transformed geometry data and none, one, or more than one portion of the combined storage unit to tessellation factors.

Figure 9:
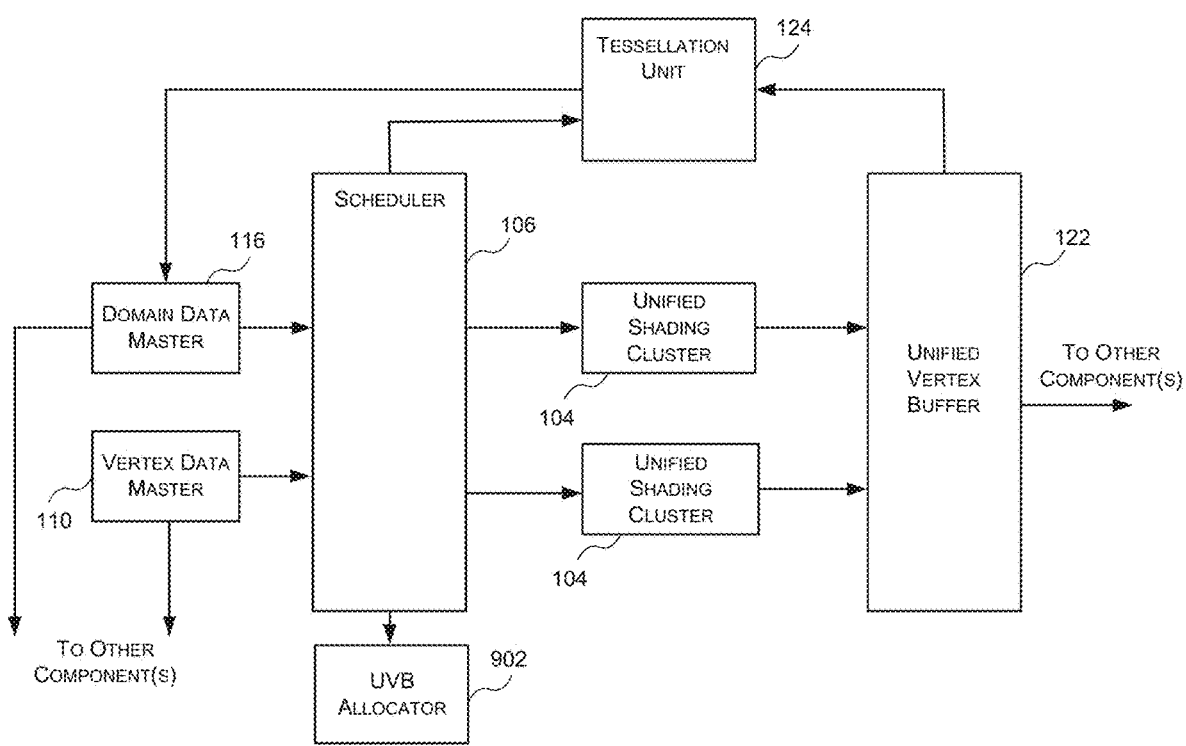
FIG. 9 is a block diagram of a part of a graphics processing unit comprising a unified vertex buffer for storing transformed geometry data and tessellation factors.

Reference is now made to FIG. 9 which illustrates an example implementation where the transformed geometry data and the tessellation factors are stored in the same storage unit. Specifically, in this implementation the tessellation unit 124 does not have a separate storage unit (e.g. TFS 704) for storing tessellation factors generated by HS tasks, instead both tessellation factors and transformed geometry data are stored in the UVB 122. Accordingly, the UVB 122 is used to store two different types of data. In this example, the scheduler 106 is configured to receive geometry processing stage shader tasks (e.g. VS, HS, DS and/or GS tasks) from the vertex data master 110 and/or domain data master 116. If the task is a HS task then the scheduler is configured to request one or more portions of the UVB from the UVB allocator 902 for storing tessellation factors; and if the task is a VS, DS or GS task that relates to the last shader stage of the geometry processing phase for a set of geometry data (e.g. for a draw call) then the scheduler 106 is configured to request one or more portions of the UVB from the UVB allocator 902 for storing transformed geometry data. When the task is allocated the required number of portions of the UVB, the task may be sent to or issued to a USC where it is executed, and the results thereof are written to the UVB as required. This allows the USC to write outputs only to the UVB instead of to both the UVB and TFS which may simplify the hardware implementation of the GPU. For example, the interface between each USC and the tessellation unit can be removed (which may, for example, save on pins).

Figure 10:
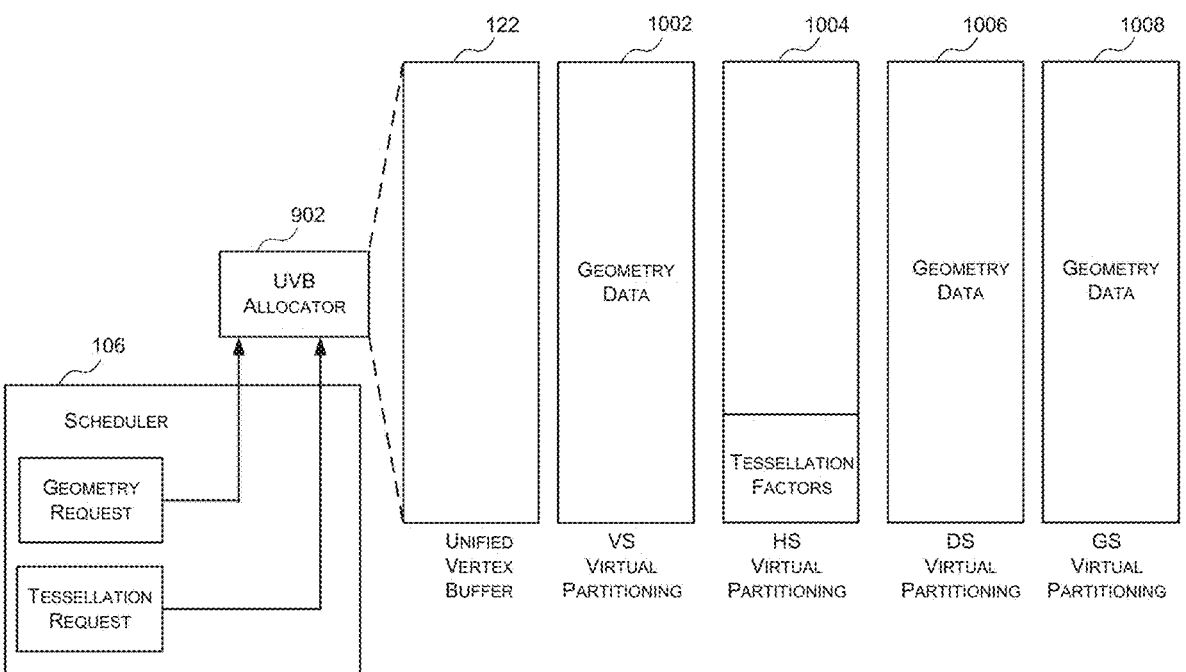
FIG. 10 is a schematic diagram illustrating an example storage unit allocator for allocating portions of the unified vertex buffer of FIG. 9 to a plurality of tasks for storing transformed geometry data and tessellation factors.

When the UVB allocator 902 receives a request for one or more portions of the UVB for storing transformed geometry data or for storing tessellation factors for a task, the UVB allocator allocates the requested one or more portions in accordance with the method 300 of FIG. 3. Specifically, the UVB allocator 902 associates the request with one of a plurality of virtual partitionings of the UVB. In this example, there is a virtual partitioning of the UVB for each type of shader task in the geometry processing phase. For example, as shown in FIG. 10, there may be a virtual partitioning 1002 for VS tasks, a virtual partitioning 1004 for HS tasks, a virtual partitioning 1006 for DS tasks and a virtual partitioning 1008 for GS tasks. The UVB allocator 902 then allocates the requested number of portions from the one or more portions allotted to the appropriate type of data in the virtual partitioning associated with the request. For example, if the request is for three portions of the UVB 122 for storing tessellation factors generated by a HS task, the request may be associated with the virtual partitioning 1004 for HS tasks which allots the bottom 25% of the UVB to tessellation factors, and the UVB allocator 902 may be configured to allocate the HS task three portions of the UVB from the 25% of the UVB allotted to tessellation factors. Similarly, if the request is for six portions of the UVB 122 for storing transformed geometry data generated by a VS task, the request may be associated with the virtual partitioning 1002 for VS tasks which allots 100% of the UVB to transformed geometry data, and the UVB allocator 902 may be configured to allocate the VS task six portions of the UVB from anywhere in the UVB.

Figure 11:
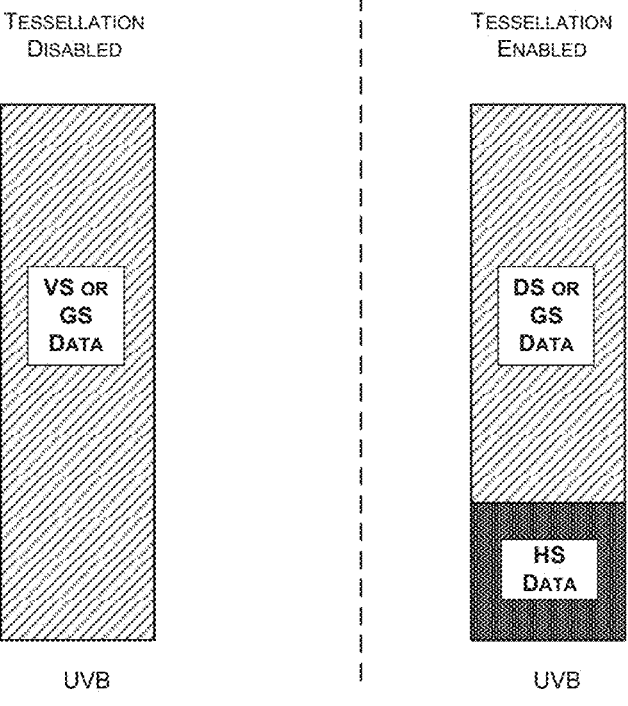
FIG. 11 is a schematic diagram illustrating use of the unified vertex buffer of FIG. 9 when tessellation is enabled and when tessellation is not enabled.

In some cases, the virtual partitionings may be configured so that if tessellation is disabled the entire UVB may be used to store transformed geometry data generated by VS or GS tasks; and if tessellation is enabled the HS cannot consume all of the UVB such that DS or GS tasks cannot write their output to the UVB. This may be accomplished by configuring the virtual partitionings as shown in FIG. 10. Specifically, this may be accomplished by configuring the virtual partitionings for the tasks that may generate the transformed geometry data that is stored in the UVB—i.e. VS, DS and GS tasks—so that they allot 100% of the UVB to transformed geometry data and 0% (i.e. none) of the UVB to tessellation factors; and configuring the virtual partitioning for HS tasks to allot a small fraction (e.g. 25%) of the UVB for storing tessellation factors. As shown in FIG. 11, this means that when tessellation is disabled the VS or GS tasks will have the whole UVB available for storing transformed geometry data, and when tessellation is enabled HS tasks cannot consume too much of the UVB so as to block the DS or GS tasks from storing transformed geometry data.

In some cases, the size of the UVB used to store both transformed geometry data and tessellation factors may be increased (compared to the size of a UVB used to store only transformed geometry data) by the size of the TFS. This may improve the performance of the GPU when tessellation is disabled as it may allow more geometry processing stage shader tasks to be in flight at the same time. In other cases, however, the size of the UVB used to store both transformed geometry data and tessellation factors may not be increased over the size of the UVB used to store only transformed geometry data. This may reduce the amount of memory in the GPU without affecting the performance of the GPU when tessellation is disabled (which is true in the majority of cases). However, this may reduce the performance of the GPU when tessellation is disabled. In either case the cost of implementing tessellation in hardware is reduced as the tessellation unit no longer needs its own storage unit to store the tessellation factors.

Figure 12:
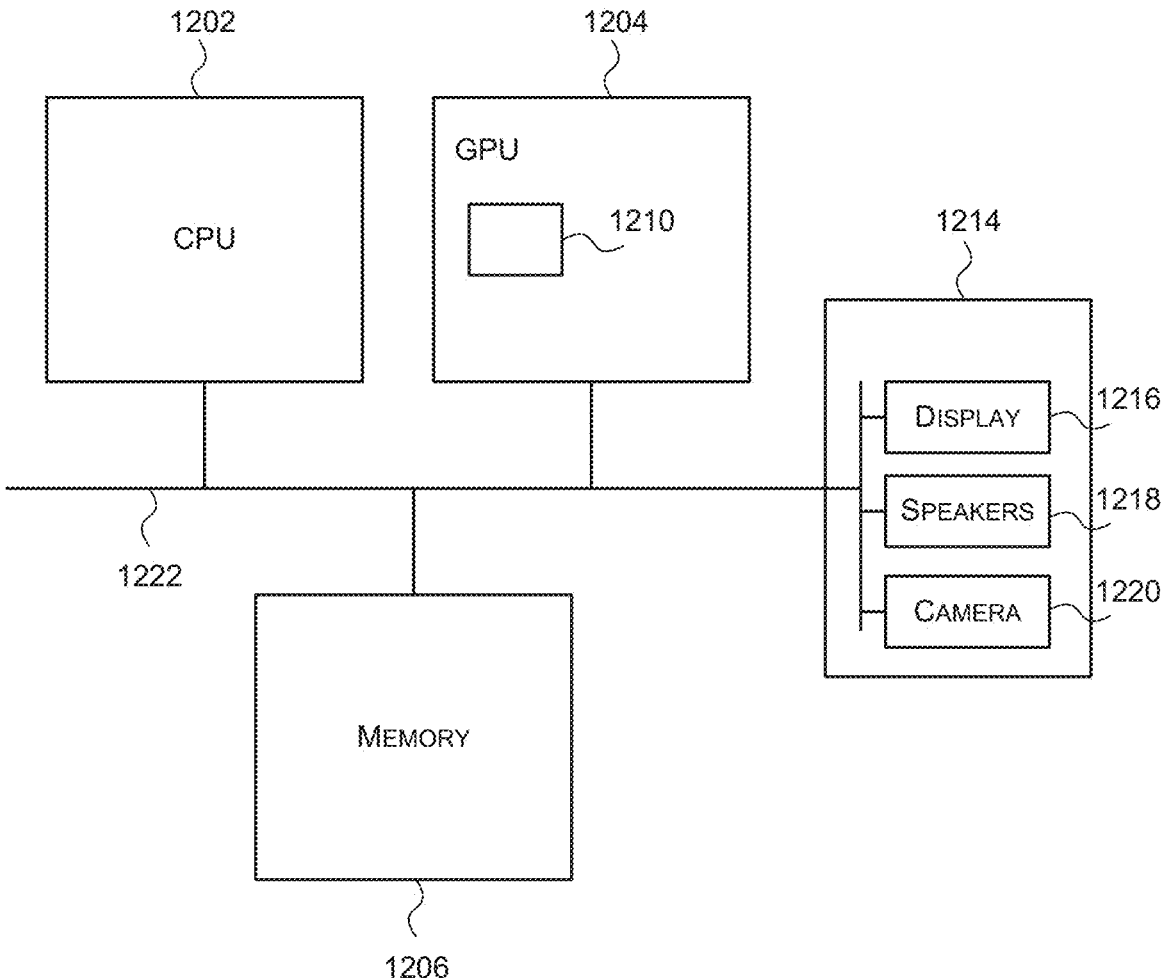
FIG. 12 is a block diagram of an example computer system in which the storage unit allocators and/or the graphics processing units described herein may be implemented.

FIG. 12 shows a computer system in which the storage unit allocators described herein may be implemented. The computer system comprises a CPU 1202, a GPU 1204, a memory 1206 and other devices 1214, such as a display 1216, speakers 1218 and a camera 1220. A processing block 1210 (which may be a storage unit allocator 402, 902 described herein) is implemented on the GPU 1204. In other examples, the processing block 1210 may be implemented on the CPU 1202. The components of the computer system can communicate with each other via a communications bus 1222.

The storage unit allocators and graphics processing units of FIGS. 1, 2, 4, 5, 7, 9 and 10 are shown as comprising a number of functional blocks or units. This is schematic only and is not intended to define a strict division between different logic elements of such entities. Each functional block or unit may be provided in any suitable manner. It is to be understood that intermediate values described herein as being formed by a block or unit need not be physically generated by a storage unit allocator or a graphics processing unit at any point and may merely represent logical values which conveniently describe the processing performed by the storage unit allocator or the graphics processing unit between its input and output.

The storage unit allocators and/or graphics processing units described herein may be embodied in hardware on an integrated circuit. The storage unit allocators and/or graphics processing units described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a storage unit allocator or a graphics processing unit configured to perform any of the methods described herein, or to manufacture a processor comprising any apparatus described herein. An integrated circuit definition dataset may be, for example, an integrated circuit description.

Therefore, there may be provided a method of manufacturing, at an integrated circuit manufacturing system, a storage unit allocator or a graphics processing unit as described herein. Furthermore, there may be provided an integrated circuit definition dataset that, when processed in an integrated circuit manufacturing system, causes the method of manufacturing a storage unit allocator or a graphics processing unit to be performed.

An integrated circuit definition dataset may be in the form of computer code, for example as a netlist, code for configuring a programmable chip, as a hardware description language defining hardware suitable for manufacture in an integrated circuit at any level, including as register transfer level (RTL) code, as high-level circuit representations such as Verilog or VHDL, and as low-level circuit representations such as OASIS™ and GDSII. Higher level representations which logically define hardware suitable for manufacture in an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a storage unit allocator or a graphics processing unit will now be described with respect to FIG. 13.

Figure 13:
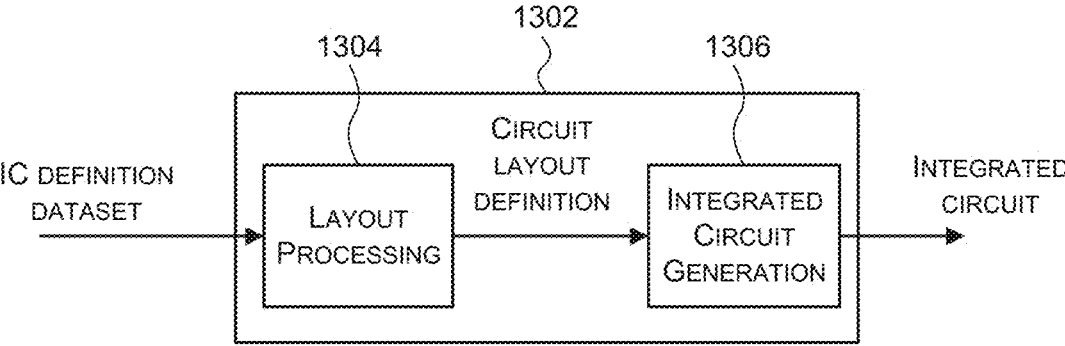
FIG. 13 is a block diagram of an example integrated circuit manufacturing system for generating an integrated circuit embodying a storage unit allocator and/or a graphics processing unit described herein.

FIG. 13 shows an example of an integrated circuit (IC) manufacturing system 1302 which is configured to manufacture a storage unit allocator and/or a graphics processing unit as described in any of the examples herein. In particular, the IC manufacturing system 1302 comprises a layout processing system 1304 and an integrated circuit generation system 1306. The IC manufacturing system 1302 is configured to receive an IC definition dataset (e.g. defining a storage unit allocator or a graphics processing unit as described in any of the examples herein), process the IC definition dataset, and generate an IC according to the IC definition dataset (e.g. which embodies a storage unit allocator or a graphics processing unit as described in any of the examples herein). The processing of the IC definition dataset configures the IC manufacturing system 1302 to manufacture an integrated circuit embodying a storage unit allocator or a graphics processing unit as described in any of the examples herein.

The layout processing system 1304 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1304 has determined the circuit layout it may output a circuit layout definition to the IC generation system 1306. A circuit layout definition may be, for example, a circuit layout description.

The IC generation system 1306 generates an IC according to the circuit layout definition, as is known in the art. For example, the IC generation system 1306 may implement a semiconductor device fabrication process to generate the IC, which may involve a multiple-step sequence of photo litho- graphic and chemical processing steps during which elec- tronic circuits are gradually created on a wafer made of semiconducting material. The circuit layout definition may be in the form of a mask which can be used in a lithographic process for generating an IC according to the circuit defi- nition. Alternatively, the circuit layout definition provided to the IC generation system 1306 may be in the form of computer-readable code which the IC generation system 1306 can use to form a suitable mask for use in generating an IC.

The different processes performed by the IC manufactur- ing system 1302 may be implemented all in one location, e.g. by one party. Alternatively, the IC manufacturing system 1302 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a storage unit allocators or a graphics processing unit without the IC definition dataset being processed so as to determine a circuit layout. For instance, an integrated circuit definition dataset may define the configuration of a reconfigurable processor, such as an FPGA, and the processing of that dataset may configure an IC manufacturing system to gen- erate a reconfigurable processor having that defined con- figuration (e.g. by loading configuration data to the FPGA).

In some embodiments, an integrated circuit manufactur- ing definition dataset, when processed in an integrated circuit manufacturing system, may cause an integrated cir- cuit manufacturing system to generate a device as described herein. For example, the configuration of an integrated circuit manufacturing system in the manner described above with respect to FIG. 13 by an integrated circuit manufac- turing definition dataset may cause a device as described herein to be manufactured.

In some examples, an integrated circuit definition dataset could include software which runs on hardware defined at the dataset or in combination with hardware defined at the dataset. In the example shown in FIG. 13, the IC generation system may further be configured by an integrated circuit definition dataset to, on manufacturing an integrated circuit, load firmware onto that integrated circuit in accordance with program code defined at the integrated circuit definition dataset or otherwise provide program code with the inte- grated circuit for use with the integrated circuit.

The implementation of concepts set forth in this applica- tion in devices, apparatus, modules, and/or systems (as well as in methods implemented herein) may give rise to perfor- mance improvements when compared with known imple- mentations. The performance improvements may include one or more of increased computational performance, reduced latency, increased throughput, and/or reduced power consumption. During manufacture of such devices, apparatus, modules, and systems (e.g. in integrated circuits)

performance improvements can be traded-off against the physical implementation, thereby improving the method of manufacture. For example, a performance improvement may be traded against layout area, thereby matching the performance of a known implementation but using less silicon. This may be done, for example, by reusing func- tional blocks in a serialised fashion or sharing functional blocks between elements of the devices, apparatus, modules and/or systems. Conversely, concepts set forth in this appli- cation that give rise to improvements in the physical imple- mentation of the devices, apparatus, modules, and systems (such as reduced silicon area) may be traded for improved performance. This may be done, for example, by manufac- turing multiple instances of a module within a predefined area budget.

The applicant hereby discloses in isolation each indi- vidual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of managing a plurality of virtual partition- ings of a storage unit comprising a plurality of portions, each virtual partitioning of the plurality of virtual partitionings allotting none, one, or more than one portion of the plurality of portions of the storage unit to each of at least two types of data, the plurality of virtual partitionings being used to allocate one or more portions of the plurality of portions of the storage unit to a plurality of tasks for temporarily storing the at least two types of data, the method comprising:

configuring each virtual partitioning of the plurality of virtual partitionings with a default configuration, the default configuration defined by a maximum number of portions of the storage unit allotted to a first type of data of the at least two types of data and a guaranteed number of portions of the storage unit for use by a task to store a second type of data of the at least two types of data; and in response to determining that a task, of the plurality of tasks, requires more than the default guaranteed num- ber of portions of the storage unit to be allocated for storing the second type of data prior to execution of the task, temporarily configuring the default configuration of one or more virtual partitionings of the plurality of virtual partitionings by reducing the maximum number of portions of the storage unit allotted to the first type of data for each of the one or more virtual partitionings, and causing the task to be initiated.

2. The method of claim 1, further comprising: in response to determining that the task has been executed, configuring the one or more virtual partitionings with the corresponding default configuration.

3. The method of claim 1, wherein the maximum number of portions of the storage unit allotted to a first type of data of the at least two types of data is equal to X–D, wherein X is a total number of portions of the storage unit and D is the guaranteed number of portions of the storage unit.

4. The method of claim 3, wherein reducing the maximum number of portions of the storage unit allotted to the first type of data for each of the one or more virtual partitionings comprises allotting a maximum of X–R portions of the storage unit to the first type of data for each of the one or more virtual partitionings, wherein R is the number of portions of the storage unit required to be allocated prior to execution of the task, and R>D.

5. The method of claim 1, wherein each task of the plurality of tasks is to be allocated at least one portion of the storage unit for storing the first type of data and/or at least one portion of the storage unit for storing the second type of data.

6. The method of claim 5, further comprising allocating the at least one portion of the storage unit for storing the first type of data and/or the at least one portion of the storage unit for storing the second type of data to the task based on one of the plurality of virtual partitionings.

7. The method of claim 6, wherein allocating the at least one portion of the storage unit for storing the first type of data and/or the at least one portion of the storage unit for storing the second type of data to the task based on the one virtual partitioning comprises allocating the at least one portion of the storage unit for storing the first type of data from the none, one, or more than one portion of the storage unit allotted to the first type of data in that virtual partitioning and/or allocating the at least one portion of the storage unit for storing the second type of data from the none, one or more than one portion of the storage unit allotted to the second type of data in that virtual partitioning.

8. The method of claim 5, wherein when a task is to be allocated at least one portion of the storage unit for storing the first type of data and at least one portion of the storage unit for storing the second type of data, a request for the at least one portion of the storage unit for storing the first type of data is made prior to a request for the at least one portion of the storage unit for storing the second type of data.

9. The method of claim 1, wherein the one or more virtual partitionings that are temporarily configured comprise virtual partitionings that allot at least one portion of the storage unit to the first type of data.

10. The method of claim 1, wherein temporarily configuring the one or more virtual partitionings comprises reducing a number of portions of the storage unit allotted to the first type of data by the one or more virtual partitionings without increasing a number of portions of the storage unit allotted to the second type of data by the one or more virtual partitionings.

11. The method of claim 1, further comprising:

in response to determining that the task requires more than the guaranteed number of portions of the storage unit to be allocated for storing the second type of data prior to execution of the task, determining whether there are any tasks of the plurality of tasks in flight that require one or more portions of the storage unit for storing the first type of data; and in response to determining that there is at least one task of the plurality of tasks in flight that requires one or more portions of the storage unit for storing the first type of data, reconfiguring the one or more virtual partitionings only after the at least one task has been executed.

12. The method of claim 1, wherein it is determined that the task requires more than the guaranteed number of portions of the storage unit to be allocated for storing the second type of data before execution of the task when the task requires more than the default guaranteed number of portions of the storage unit to be allocated to the task for storing the second type of data.

13. The method of claim 1, wherein it is determined that the task requires more than the guaranteed number of portions of the storage unit to be allocated for storing the second type of data before execution of the task when the task forms part of a group of tasks and collectively the tasks in the group of tasks require more than the default guaranteed number of portions of the storage unit to be allocated for storing the second type of data.

14. The method of claim 1, wherein causing the task to be initiated comprises either sending the task to a scheduler, or causing a task master to initiate the task.

15. The method of claim 1, wherein configuring a virtual partitioning of the plurality of virtual partitionings comprises storing information in memory that identifies the none, one, or more than one portion of the storage unit allotted to each type of data of the at least two types of data by that virtual partitioning.

16. The method of claim 1, wherein the default guaranteed number of portions of the storage unit for use by a task to store the second type of data is selected such that a threshold percentage of the plurality of tasks require the default guaranteed number of portions of the storage unit for storing the second type of data or fewer than the default guaranteed number of portions of the storage unit for storing the second type of data.

17. The method of claim 1, wherein at least two of the plurality of virtual partitionings are different.

18. The method of claim 1, wherein the at least two types of data comprise temporary data and attribute data.

19. A non-transitory computer readable storage medium having stored thereon computer readable instructions that, when executed at a computer system, cause the computer system to perform the method as set forth in claim 1.

20. A non-transitory computer readable storage medium having stored thereon a computer readable dataset description of a graphics processing unit configured to perform the method as set forth in claim 1 that, when processed in an integrated circuit manufacturing system, causes the integrated circuit manufacturing system to manufacture an integrated circuit embodying the graphics processing unit.

* * * * *